(12) United States Patent
Bücher et al.

(10) Patent No.: US 12,361,706 B2
(45) Date of Patent: Jul. 15, 2025

(54) DEVICE AND METHOD FOR PROCESSING AT LEAST ONE WORK AREA WITH A PROCESSING TOOL

(71) Applicant: Advanced Realtime Tracking GmbH & Co. KG, Weilheim (DE)

(72) Inventors: Robert Bücher, Raisting (DE); Nick Jagiella, Munich (DE); Frank Schröder, Munich (DE); Konrad Zürl, Schwarzenbruck (DE)

(73) Assignee: Advanced Realtime Tracking GmbH & Co. KG, Weilheim (DE)

( * ) Notice: Subject to any disclaimer, the term of this patent is extended or adjusted under 35 U.S.C. 154(b) by 5 days.

(21) Appl. No.: 17/291,052

(22) PCT Filed: Nov. 4, 2019

(86) PCT No.: PCT/EP2019/080080
§ 371 (c)(1),
(2) Date: May 4, 2021

(87) PCT Pub. No.: WO2020/094558
PCT Pub. Date: May 14, 2020

(65) Prior Publication Data
US 2021/0358110 A1 Nov. 18, 2021

(30) Foreign Application Priority Data
Nov. 5, 2018 (DE) .................... 10 2018 127 518.8

(51) Int. Cl.
*G06T 7/00* (2017.01)
*G06F 18/241* (2023.01)
(Continued)

(52) U.S. Cl.
CPC ............ *G06V 20/10* (2022.01); *G06F 18/241* (2023.01); *G06T 7/0004* (2013.01); *G06V 10/50* (2022.01);
(Continued)

(58) Field of Classification Search
CPC ......... G06T 7/0004; G06T 2207/20081; G06T 2207/30164; G06K 9/6268; G06V 10/462; G06V 2201/06; G06V 10/50; G06V 20/10
See application file for complete search history.

(56) References Cited

U.S. PATENT DOCUMENTS 6,928,332 B2   8/2005   Gass
8,615,320 B2   12/2013  Krapf et al.
(Continued)

FOREIGN PATENT DOCUMENTS

AU   2017254953 A1   11/2017
CN   104933436 A     9/2015
(Continued)

OTHER PUBLICATIONS

Malamas et al., "A survey on industrial visions systems, applications and tools", Image and Vision Computing, 2003, pp. 171-188, vol. 21:2.

*Primary Examiner* — Fahd A Obeid
*Assistant Examiner* — Reva R Moore
(74) *Attorney, Agent, or Firm* — The Webb Law Firm

(57) ABSTRACT

Provided is a device having a machining tool for machining at least one working area of an object. An image-capturing device generates at least one image of the at least one working area and at least one sensor generates sensor data during machining of the at least one working area are arranged on the machining tool. The device also has an evaluation unit which has a computing model that has been (Continued)

trained by way of machine learning on the basis of images of working areas and sensor data by way of which the at least one working area and/or a situation during machining of the at least one working area is able to be identified.

25 Claims, 15 Drawing Sheets

(51) Int. Cl.
   *G06V 10/50* (2022.01)
   *G06V 20/10* (2022.01)
(52) U.S. Cl.
   CPC ............ *G06T 2207/20081* (2013.01); *G06T 2207/30164* (2013.01); *G06V 2201/06* (2022.01)

(56) References Cited

U.S. PATENT DOCUMENTS

| | | | |
|---|---|---|---|
| 9,238,304 B1* | 1/2016 | Bradski | B25J 9/1612 |
| 2009/0192644 A1 | 7/2009 | Meyer et al. | |
| 2011/0001799 A1 | 1/2011 | Rothenberger et al. | |
| 2013/0178952 A1 | 7/2013 | Wersborg et al. | |
| 2015/0253766 A1 | 9/2015 | Pettersson et al. | |
| 2015/0261198 A1 | 9/2015 | Rice | |
| 2017/0228891 A1 | 8/2017 | Ward | |
| 2018/0010903 A1 | 1/2018 | Takao et al. | |
| 2018/0096485 A1 | 4/2018 | Held | |
| 2019/0220029 A1 | 7/2019 | Fukuhara et al. | |
| 2019/0294139 A1* | 9/2019 | Adachi | G05B 19/4065 |
| 2019/0339679 A1* | 11/2019 | Ando | G06N 20/00 |
| 2020/0209836 A1* | 7/2020 | Bauer | G06Q 50/04 |
| 2021/0056682 A1 | 2/2021 | Ward | |

FOREIGN PATENT DOCUMENTS

| | | |
|---|---|---|
| CN | 107883867 A | 4/2018 |
| DE | 19843162 A1 | 9/1998 |
| DE | 102006014345 B3 | 8/2007 |
| DE | 102012219871 A1 | 4/2014 |
| EP | 2076357 B1 | 9/2007 |
| EP | 2539759 A1 | 1/2013 |
| EP | 2916189 A1 | 9/2015 |
| JP | 201860512 A | 4/2018 |
| WO | 2015140043 A1 | 9/2015 |
| WO | 2016157593 A1 | 10/2016 |
| WO | 2018158601 A1 | 9/2018 |
| WO | 2019138238 A1 | 7/2019 |

* cited by examiner

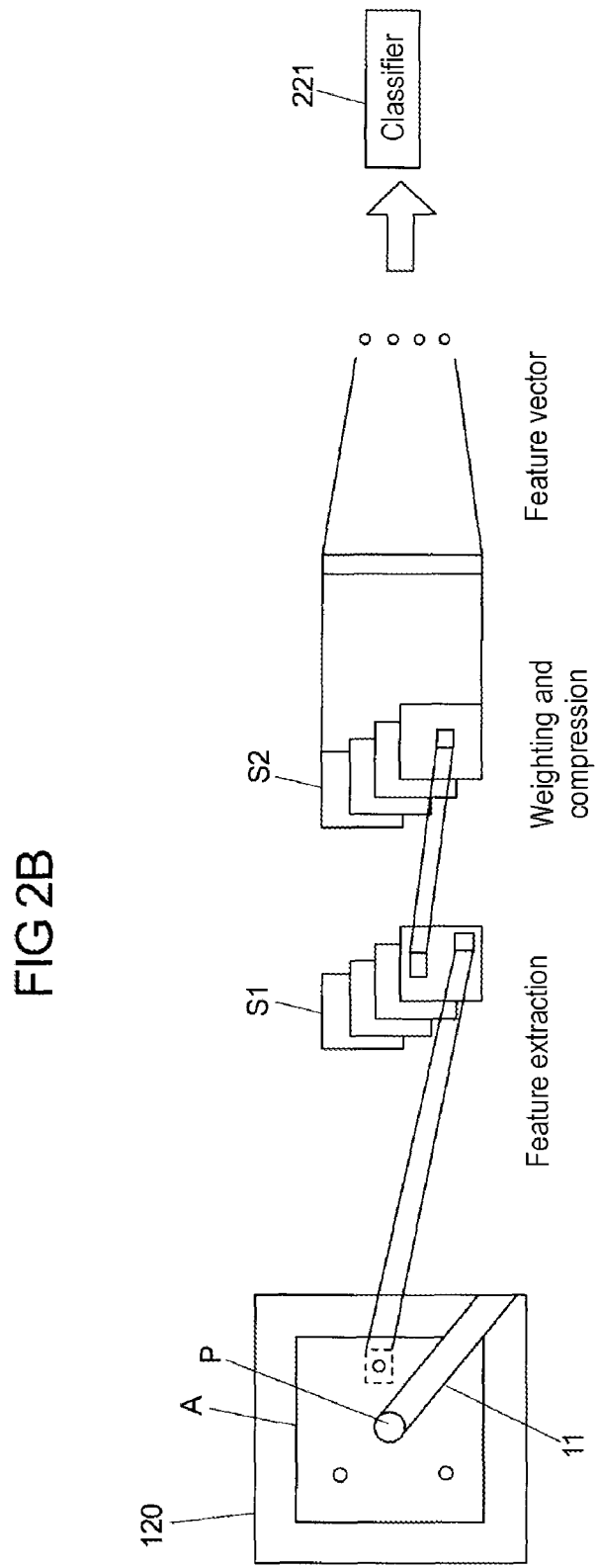

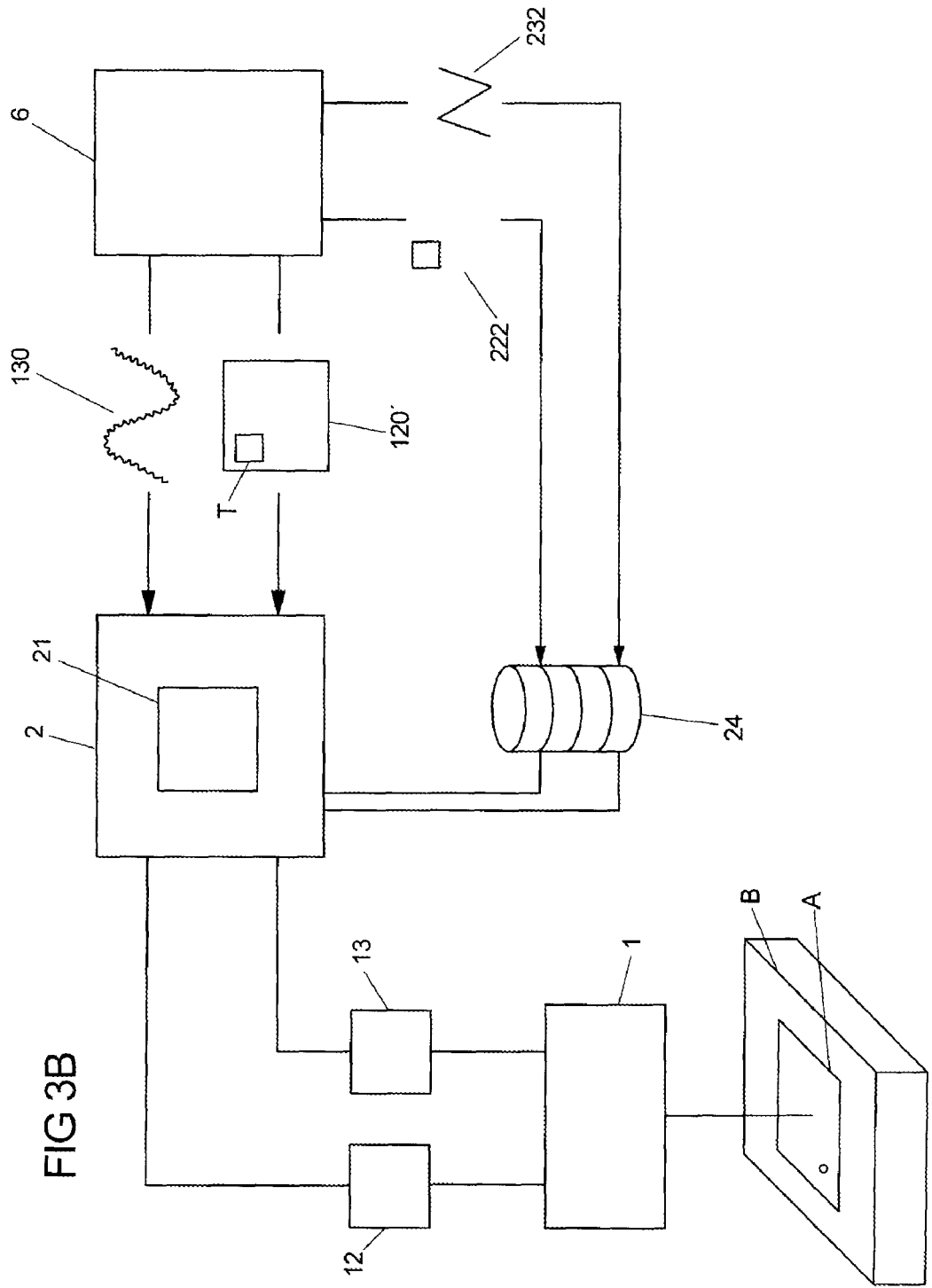

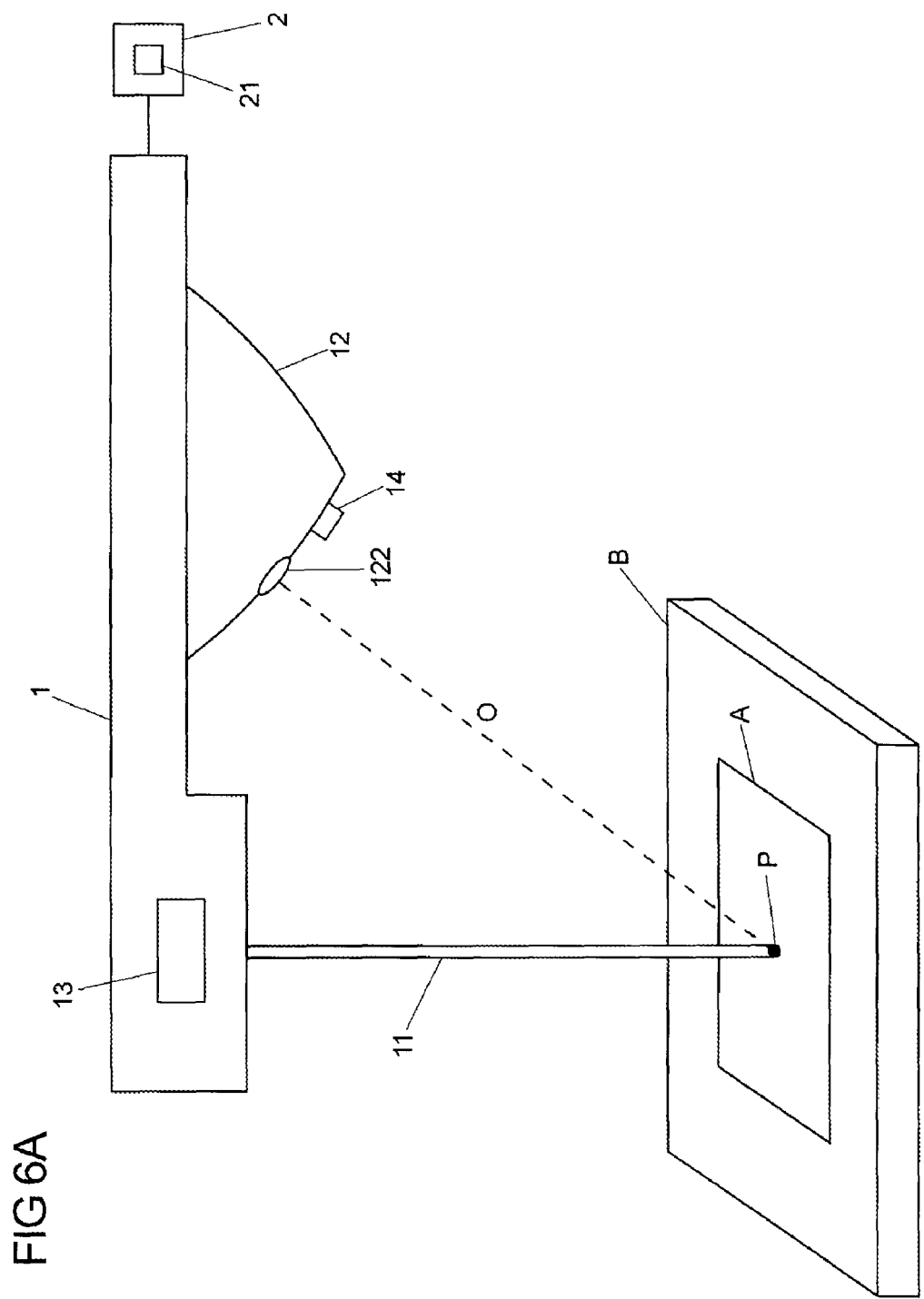

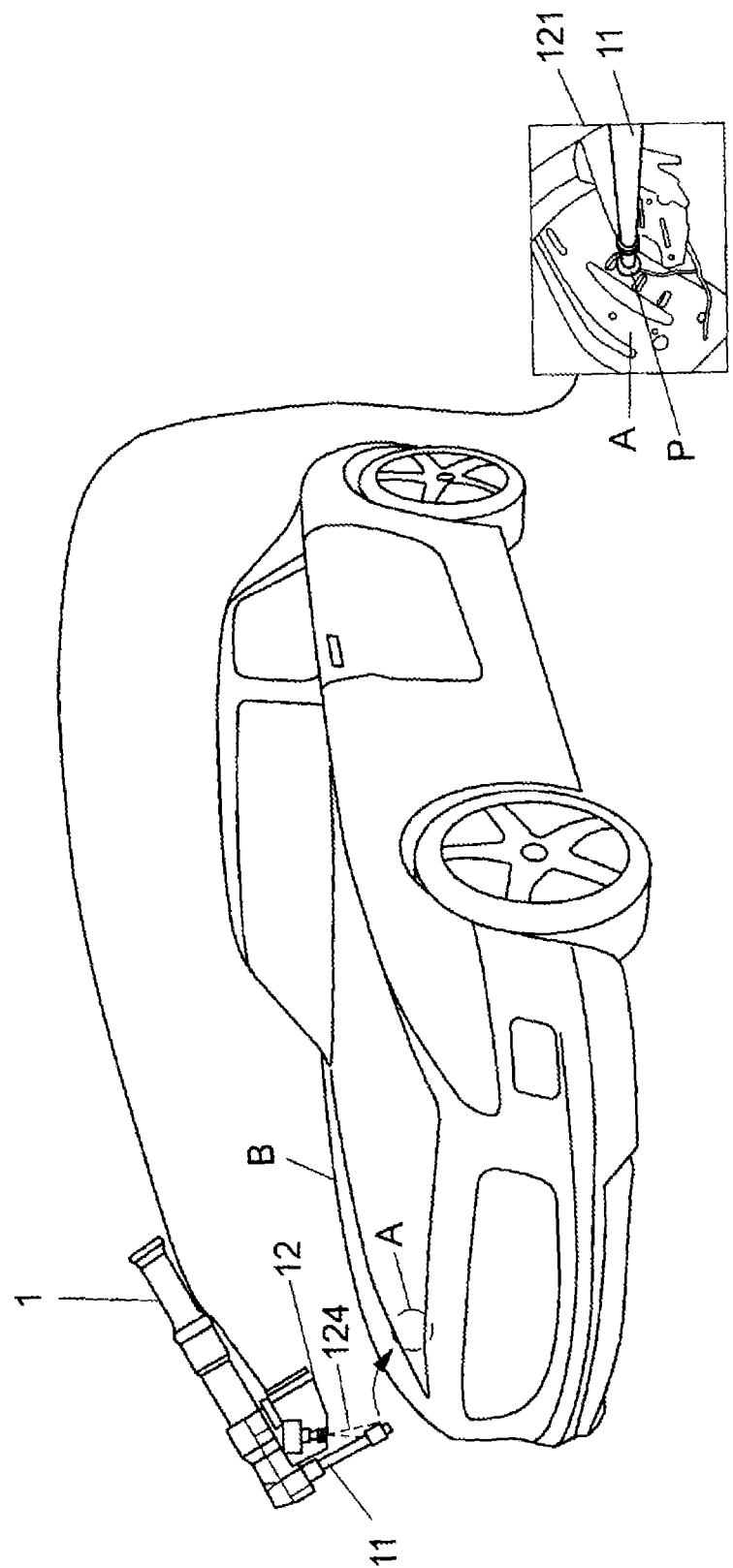

DEVICE AND METHOD FOR PROCESSING AT LEAST ONE WORK AREA WITH A PROCESSING TOOL

CROSS-REFERENCE TO RELATED APPLICATIONS

This application is the United States national phase of International Application No. PCT/EP2019/080080 filed Nov. 4, 2019, and claims priority to German Patent Application No. 10 2018 127 518.8 filed Nov. 5, 2018, the disclosures of which are hereby incorporated by reference in their entirety.

BACKGROUND OF THE INVENTION

Field of the Invention

The invention relates to a device having a machining tool for machining at least one working area and to a method for machining at least one working area using a machining tool.

Description of Related Art

DE 10 2012 219 871 A1 from the prior art discloses a device for logging screwing operations. In this case, after a screw has been screwed in and the installation tool has been raised out of a screwing position, an image is captured automatically by a digital camera. The screw and its immediate surroundings are contained in the captured image.

During machining of the object, for example by a human user of the machining tool, it is possible for human errors to occur. It may therefore be necessary for the device to comprise mechanical and/or automatic quality control systems in order to prevent, to avoid and/or to correct human errors.

SUMMARY OF THE INVENTION

It is an object underlying the proposed solution to avoiding errors when machining the at least one working area and to increasing the quality of the machining.

This object is solved by a device and a method for machining at least one working area having features as described herein.

A device for machining at least one working area of an object comprises a machining tool. Such machining may involve for example industrial installation and in particular screwing and riveting on an object such as a vehicle, but is not limited thereto. The machining tool may be formed, in one refinement, by an installation tool, such as an industrial screwdriver, a hand-held assembly device, a pistol-grip screwdriver, a rivet gun, a clamping device, a drill, an axial screwdriver or an offset screwdriver.

An image-capturing device, for example a camera module, for generating at least one image of the at least one working area and at least one sensor, for example an inertial sensor, for generating sensor data during machining of the at least one working area, are arranged on the machining tool.

The at least one image and the sensor data may be able to be used to dynamically identify working areas or working points at which the machining tool acts on the working area. The at least one image may in this case show the working area, a section of the working area containing the working point and, optionally, also a section, for example a tool tip, of the machining tool. The at least one image may for example be a thermal image or a 2D or 3D recording or display. The at least one image may in particular be a topography of the surface of the at least one working area. The at least one image may also be able to be generated by sampling the surface. In one refinement, the sampling may take place using light. Ultrasound or laser sampling may for example be used for the sampling. A laser scanner or a time-of-flight camera may in particular be used for the sampling.

The at least one image and/or the sensor data may of course be able to be generated before and/or after machining of the at least one working area. In one refinement, the at least one image and/or the sensor data are able to be generated when the machining tool approaches the at least one working area. It is also conceivable and possible for the at least one image to be able to be generated on the basis of the sensor data. By way of example, the generation of the at least one image may begin or end with the generation of certain sensor data or a certain pattern of sensor data. On the contrary, the sensor data may also be generated on the basis of the at least one image. By way of example, a certain image or a certain pattern on an image may start or end the generation of sensor data by the at least one sensor.

In one refinement having a machining tool formed by an industrial screwdriver, a sensor in the form of a screwing controller may for example measure whether a correct angle of rotation has been reached. It is thus possible to be able to measure incorrect angles of rotation, for example. When machining a multiplicity of working areas, the angles of rotation may be able to be measured by the screwing controller for each working area. In a further refinement, the at least one sensor may be formed by an inertial measuring unit (IMU), an absolute position sensor, an acoustic sensor, an ultrasound sensor, an acceleration sensor, a vibration sensor that is able in particular to detect play of a tool component, in particular at the start of machining of the object by the machining tool, a distance sensor, in particular a time-of-flight (TOF) camera, a QR code scanner, a barcode scanner or a magnetic field sensor. The at least one magnetic field sensor may in particular determine the position and/or absolute position of the machining tool in relation to the object and/or the working area on the basis of the Earth's magnetic field. The magnetic field sensor may in this case make use of the fact that different working areas locally modify the Earth's magnetic field to different extents, that is to say have a signature in the Earth's magnetic field. A multiplicity of sensors is of course conceivable and possible, these being of different designs. The sensor data may for example comprise positional bearing data. The positional bearing data may in particular be able to be generated by way of marker-based tracking or using an existing radio infrastructure comprising in particular wireless techniques such as WLAN, Bluetooth, ultra-wideband or ZigBee.

The generation of the at least one image may in particular thus begin or end with a distance measurement. By way of example, the capturing of the at least one image may be started with a previous laser distance measurement.

The device furthermore comprises an evaluation unit, for example a processing device such as an industrial PC. The evaluation unit may comprise software that comprises modules for capturing, processing and evaluating images. For the evaluation, the evaluation unit has a computing model that may serve to evaluate the at least one image and the sensor data. The computing model may be used to identify the at least one working area and/or a situation during machining of the at least one working area. By way of the evaluation, the machined working area or the working area to be machined may thus be able to be determined by the computing model. The evaluation unit may thus also serve to systematically and/or statistically analyze the surroundings on the basis of the at least one image and/or the sensor data.

A working point to be machined or a machined working point of the at least one working area may furthermore be able to be determined by the computing model. Preconditions for the machining of the working point may also be able to be determined by way of the computing model. One precondition is for example the use of a tool component, of a component to be installed and/or an absolute position or position of the machining tool.

Using the computing model, it may also be possible to determine a relative absolute position of the machining tool with respect to the working point or with respect to the at least one working area by way of the at least one image and/or the sensor data. The computing model has been trained by way of machine learning on the basis of images of working areas and sensor data. The training may take place before the object is machined for the first time by the machining tool. During training, in one refinement, in a first step, an image is captured as reference image of each working area and/or working point. Various situations and combinations of images and sensor data may in particular be captured during machining of the at least one working area. Furthermore, (representative) positions, absolute positions and/or angles of the machining tool, in particular tool positions, in relation to the working area and/or working point may be captured.

In one exemplary embodiment, machine learning comprises at least one neural network, at least one convolutional neural network, at least one bag of words and/or at least one uncorrelated decision tree (random forest). Further machine learning methods are of course conceivable and possible.

In a second step, in one exemplary embodiment, the computing model may generate at least one classifier from at least one image and/or the sensor data. The at least one classifier may represent at least one essential feature of the at least one image and/or the sensor data. An essential feature may be an item of image information and/or sensor information that is more relevant than other image information and/or sensor information.

An essential feature may for example be a section of the at least one image and/or of the sensor data that differs from an adjacent section to a greater extent than other mutually adjacent sections of the at least one image and/or the sensor data differ from one another. An essential feature may optionally serve to recognize a particular working area from various angles, absolute positions and/or positions of the machining tool. An essential feature may in particular also serve, in the case of a movement of the machining tool in relation to the machined working area or working area to be machined by the evaluation unit, to recognize that the working area is the same as long as the essential feature is present (feature tracking). A movement of the machining tool in relation to the machined working area or working area to be machined may for example be a change in the absolute position or position, in particular the angle and/or the distance from the working area to be machined.

In one embodiment, a dark circle on a bright surface is an essential feature of the at least one image. Likewise, a sequence of images may contain an essential feature that is able to be represented by the at least one classifier. Combinations of the at least one image and of the sensor data may likewise contain an essential feature that is able to be represented by the at least one classifier.

The computing model may in particular distinguish between optically similar working areas in which the images are identical on the basis of the sensor data. By way of example, in the case of optically identical screwing points (owing to the symmetry of the object), it may be possible to distinguish between the screwing points on the basis of an angle of the machining tool in relation to the object.

By way of the at least one classifier, the computing model, in one refinement, is able to identify the at least one working area on the basis of at least one image and/or sensor data. In one refinement, the computing model may ascertain a probability level for the identification. The probability level may indicate the probability of the at least one working area being the identified working area (confidence). By way of example, the probability level for correct identification may be between 0.00 (low probability level) and 1.00 (high probability level).

In one variant, an alternative probability level may additionally be determined of the at least one working area being a working area other than the one that is identified. It is possible to estimate a reliability of the identification from the difference between the probability level for the identified working area and the alternative probability level. The reliability of the identification may in this case increase in line with the size of the difference. That is to say, the reliability of a prediction may be quantified by score differences between the best and second-best prediction that the working area is an identified or an alternative working area. If the difference is large, the prediction is relatively reliable. If the difference is marginal, the risk of confusion and therefore also the uncertainty increases.

The computing model may additionally use the at least one classifier to be able to determine compliance with a precondition on the basis of the at least one image and/or the sensor data.

In one embodiment, the at least one classifier may provide a pixel-based evaluation, for example in the form of a heat map. The evaluation may specify which parts of the current image have particularly pronounced matches and/or differences with respect to previously known images in the training data record. The computing model may thus be designed to visually overlay evaluation information on the at least one image. The evaluation information may be based on a similarity comparison between at least one section of the at least one image and the at least one classifier and/or images of working areas with which the computing model was trained. By way of example, the evaluation information may specify how similar the at least one section is to the at least one classifier and/or images of working areas with which the computing model was trained.

The at least one image containing the visually overlaid evaluation information may be able to be displayed to a user. The evaluation information may be used in order to identify anomalies in the at least one image. An anomaly may be for example an (undesired, random) concealment of a section of the at least one image. By way of example, a lens of a camera of the image-capturing device may be (randomly, undesirably) concealed by an object or a body part of the user. Such objects may be for example a cable, a wire and/or a cord. An irregularity in the at least one working area or in the machining tool, in particular in the tool component, may likewise be detected using the evaluation information.

In one variant embodiment, the evaluation unit is designed to identify static areas in the at least one image that, in spite of the movement of the machining tool in relation to the object, are unchanged over a sequence of multiple images. Static areas of the at least one image may be identified across all of the training images and/or sensor data during the training process, that is to say during training of the computing model. A static area may for example be a section of a tool component, in particular of a machining tool. Fault-free operation of the image-capturing device may be able to be checked on the basis of the static area. If for example the static area changes in terms of imaging parameters such as brightness or sharpness, a camera defect, camera soiling, an incorrect camera position and/or an incorrect camera setting could be present.

In one exemplary embodiment, the computing model extracts features from the at least one image, then weights and compresses the features in order to find essential features, and generates the at least one classifier from the at least one essential feature. Generating the at least one classifier may for example result in the computing model, when identifying the at least one working area on the basis of the at least one image, identifying the at least one working area on the basis of the shape and/or arrangement of holes in the at least one working area. Training of the computing model may also include a previously learned working area being identified by the computing model and the result (correct or incorrect) being used to improve the computing model (supervised learning; back propagation). The weighting of the features is thereby able to be improved.

In one exemplary embodiment in which the computing model is not trained at the outset, the computing model may be able to be trained as follows: In a first step, at least one image of at least one working point is generated using the image-capturing device. In a second step, it is checked for the at least one image whether the computing model is able to identify the at least one working point on the basis of the at least one image. In the case of incorrect identification, in a third step, the at least one image is added to a training data record or a data pool for the at least one classifier, with which the at least one classifier is retrained. The steps are repeated until the at least one working point is identified correctly or with a desired probability level, for example over 0.75, by the computing model. In one variant, the at least one working point is in the form of a screwing point.

In one exemplary embodiment, the at least one image is used by the evaluation unit to correct the sensor data. By way of example, a measurement of the acceleration, the angle, the absolute position and/or the position, in particular in relation to the at least one working area, by the at least one sensor, in particular an inertial sensor, may be able to be corrected by way of the at least one image. In order to correct the sensor data, it may be possible for example to use a recognition of (essential) features, such as holes in or edges of the object, in particular of the at least one working area, on the at least one image. A correction may for example comprise a measured acceleration being corrected on the basis of the movement of an essential feature over at least three images. The measurement of a direction of rotation of the machining tool by the at least one sensor may likewise be able to be corrected by way of the at least one image.

In a further refinement, a tool component, such as an extension, a socket and/or a bit, is able to be determined by the evaluation unit, in particular by way of the image-capturing device and/or of the at least one sensor. The evaluation unit may for example use the at least one image and/or the sensor data to recognize what size or what type of bit is arranged on the machining tool. The tool component may in particular be able to be determined on the basis of a characteristic pattern, a label and/or a marking on the tool component. By way of example, the marking may be optical. Other barcodes or QR code markings, in particular magnetic ones, are however also conceivable and possible. Wear of the tool component may additionally be able to be recognized by the evaluation unit, in particular by the image-capturing device and/or the at least one sensor. By way of example, wear of the tool component may be able to be recognized on the basis of play of the tool component, in particular of a screwdriver/bit system. The evaluation unit may be designed to determine a usage time of the tool component, for example on the basis of the play of the tool component or on the basis of the wear, this usage time indicating the length of time for which the tool component has already been used.

In one exemplary embodiment, an absolute position or position of the machining tool, such as for example an angle in relation to the at least one working area, or a position in relation to the object, may be able to be determined by the evaluation unit.

A component, such as a screw, may furthermore be able to be determined by the evaluation unit. The absence, that is to say the lack of presence of a component, on the object, a defective component, an incorrect position of a component on the object and/or a geometric fault with the component may in particular be able to be recognized by the evaluation unit. The evaluation unit may additionally be designed to recognize further defects with the at least one working area, such as color defects. In a further refinement, the evaluation unit is designed to identify an area of the object that should not be machined and/or to distinguish it from the at least one working area.

In one variant, provision is made for an indicator device that is designed to indicate a required exchange of the at least one tool component of the machining tool to a user of the machining tool. By way of example, the indicator device may indicate to the user that the tool component should be exchanged when a predefined degree of wear of the tool component is exceeded. The indicator device may likewise indicate that a tool component other than the one currently arranged on the machining tool is necessary for machining the working area. In one variant, the indicator device may monitor the exchange of the at least one tool component by way of evaluating the at least one image and/or the sensor data. By way of example, the indicator device may monitor the user on the basis of the at least one image and/or the sensor data during the exchange of the tool component and possibly indicate errors during the exchange.

In one exemplary embodiment, the computing model is designed to identify an installation step in an installation process on the basis of a sequence of images and/or sensor data. A sequence of images may be formed for example by multiple images that have been generated with a time offset from one another. A sequence of sensor data may likewise for example be formed by multiple sections of sensor data that were generated with a time offset from one another. An installation step may for example comprise a change in an absolute position and/or a position of the machining tool and/or an action or a sequence of actions on the at least one working area using the machining tool. An installation process may be a sequence of installation steps. In one refinement, an installation step comprises screwing at a working point, such as a screwing point.

In one exemplary embodiment, the evaluation unit is designed to select a key area of the at least one image for training the computing model based on a user input. A key area may be a region of interest that should be used by the computing model to generate the at least one classifier. The region of interest may in particular contain at least one essential feature. The selection of a key area may be used to ignore a background of the at least one image for training the computing model. The background may for example be an area that contains fewer features than an area that is arranged closer to the working point (along an axis from the machining tool to the object) than the background. By way of example, selecting the key area may save time for training the computing model. The background may in principle also be used to identify the at least one working area using the computing model, for example by way of the different depths of focus of the background in different working areas.

In one alternative embodiment, the background, in particular a remote area, is able to be masked automatically by way of the evaluation unit, for example on the basis of a threshold value of the depth of focus. A masked area is not taken into consideration for the evaluation.

In one refinement, a distance between the machining tool and the object may be able to be measured by way of a distance measurement module of the machining tool. In one refinement, the distance measurement module comprises a laser beam oriented at the working point in combination with a camera. An installation depth to be achieved may be able to be ascertained by way of the distance measurement module. It is thus possible to add a further quality statement, using which it may be possible to recognize successful machining of the at least one working area. By way of example, it may be the case that, in the event of incorrect screwing operations, the preset parameters have been reached and correct screwing is indicated by the evaluation unit. The measurement of the installation depth in such cases may serve to establish that a head, for example a screw head, of the component to be installed, for example a screw, is not yet flat and that incorrect installation, for example incorrect screwing, is thus present.

The distance measurement module may for example comprise a TOF camera using which it is possible to perform a time-of-flight (TOF) measurement. The distance from the background may optionally be determined in different working areas using the distance measurement module. The distance from the background may in this case also be used by the computing model to identify the at least one working area.

In a further refinement, the evaluation unit is designed to select a key area of the at least one image for identifying the at least one working area based on a user input. The user may for example select the key area during machining of the working area by the machining tool.

In one exemplary embodiment, the image-capturing device is designed to generate a multiplicity of images before, during and/or after the action of the machining tool on the at least one working area. The image-capturing device may in principle generate images at any time. In one variant, the image-capturing device generates at least one image when the machining tool acts on the at least one working area in order to machine it. The image-capturing device may be designed to start and/or to end the generation of images automatically based on sensor data. By way of example, the image-capturing device may end the generation of images when the machining tool is put down by the user. The putting down of the machining tool may be able to be measured for example by way of an (inertial) sensor. The image-capturing device may start the generation of images for example when a user brings the machining tool close to the at least one working area.

In one refinement, it is possible to vary a number of the generated images per unit of time using the image-capturing device. The image-capturing device may thus vary a rate of the image capturing. A (wireless) transmission rate, that is to say a frequency of the transmission, of images and/or sensor data from the image-capturing device and/or the at least one sensor to the evaluation unit may likewise be variable. By way of example, the transmission rate may be low when the machining tool is put down, and be high when the at least one working area is being machined by the machining tool. In one embodiment, it is possible to estimate times and paths by way of the sensor data when the machining tool is put down in a cyclic manner. A transmission may in particular be started with a high frequency at the beginning of machining of the at least one working area or when approaching the at least one working area. Images and/or sensor data may in principle be transmitted at a low frequency from the image-capturing device and/or the at least one sensor to the evaluation unit at any time during operation of the device.

In one exemplary embodiment, the image-capturing device comprises at least one camera. The at least one camera may be able to be used to capture the at least one image. In order to capture a magnified image, the at least one camera may comprise a zoom lens. The at least one camera may then zoom in on the at least one working area. The at least one camera may of course use the zoom lens to capture a smaller image. The at least one camera may then zoom out from the at least one working area.

The image-capturing device, in particular the at least one camera, may be arranged on the machining tool by way of an adapter. The adapter may be designed specifically for the machining tool. Using the adapter, the image-capturing device, in particular the at least one camera, may be able to be arranged on machining tools of various types. Various types of machining tool may differ from one another in terms of different shapes, for example in terms of a round or angular cross section, meaning that an adapter is necessary to mount the image-capturing device.

In one exemplary embodiment, the at least one camera is able to be adjusted in relation to the machining tool. By way of example, the at least one camera may be mounted on the machining tool so as to be movable and/or rotatable in relation to the machining tool. The at least one camera may for example be able to be rotated about a tool axis and/or be able to be displaced along the tool axis. The tool axis may extend along the machining tool essentially from a handle to be held by the user to a tool tip for machining the at least one working area.

In one refinement, the at least one camera is designed as a barcode reader or may be used to read barcodes.

In a further exemplary embodiment, the image-capturing device comprises at least two cameras for simultaneously generating at least two images of the at least one working area. The images generated by the at least two cameras may display overlapping, identical or different areas of the at least one working area. The at least two images may additionally be stitched together to form a panorama, blended or fused together (in terms of content) and/or be formed as a stereo image. A stereo image may in particular serve to calculate depth information. The at least two cameras may thus generate a 3D view. The 3D view may be used to distinguish between near field and far field, that is to say for example between the at least one working area and a background. In one exemplary embodiment, the image-capturing device comprises at least one lens. The at least one lens may comprise the end of at least one glass fiber. The image-capturing device uses the at least one lens to capture the at least one image. At least one optical axis of the at least one lens may intersect a working point at which the machining tool acts on the at least one working area. At least one detection axis of the at least one sensor may likewise intersect the working point. The at least one detection axis of the at least one sensor may for example be a direction in which the at least one sensor is oriented.

In one alternative exemplary embodiment, the at least one optical axis of the at least one lens of the image-capturing device and/or the at least one detection axis of the at least one sensor extends parallel to an action axis along which the machining tool acts on the at least one working area. The parallel orientation of the at least one optical axis and of the action axis may allow an axially parallel viewing direction. In one variant, a multiplicity of lenses of the image-capturing device and/or a multiplicity of sensors are arranged annularly around the action axis. By way of example, a parallel orientation of the action axis and of the at least one optical axis and/or of the at least one detection axis may be made possible by way of integrating at least one camera and/or at least one sensor in a ring component, such as an adapter ring. The ring component may be arranged on the machining tool. The action axis may extend through the ring-shaped opening of the ring component. The ring component may furthermore comprise at least one lens.

In one exemplary embodiment, a connecting straight line between two lenses, in particular between two ends of two glass fibers, and/or between two sensors, intersects the action axis. That is to say, the two lenses and/or the two sensors may be located opposite one another about the action axis.

In one refinement, the image-capturing device comprises at least one illumination device. The illumination device may be used to illuminate the at least one working area. In one variant, only a section of the at least one working area is able to be illuminated by the illumination device. The illumination device may likewise illuminate the machining tool or at least part thereof. The illumination device may in particular illuminate a tool component of the machining tool with which the machine tool acts on the at least one working area. The illumination device may for example comprise at least one light source. The spectrum of the at least one light source may in principle comprise any wavelength or a spectrum of wavelengths. The at least one light source may in particular output a full spectrum or infrared light. The device may thereby be independent of any external illumination, for example of the illumination in a workshop.

The at least one light source may output light in a manner synchronized with the generation of the at least one image, in particular with the capturing of the at least one image by the at least one camera. The depth information of the image-capturing device may likewise also be used to control the at least one light source. By way of example, a remote area may be lit to a lesser extent than a close area. The further-away areas may thus be lit to a lesser extent.

The at least one light source may of course in principle output light at any time and for any length of time and/or in any time interval. The at least one light source may in particular output light in order to mark a position, in particular of a working point to be machined, of the at least one working area. The light source may for example be designed as a projector. The light source may then be used to project at least one pattern onto the at least one working area. The at least one pattern may for example contain a name of a section of the at least one working area or a direction instruction. The at least one pattern may be able to be projected in any direction from the machining tool onto the at least one working area. The risk of incorrect placement of the machining tool by the user is thus able to be reduced. A training time for a new colleague may furthermore be reduced.

In one refinement, the illumination device comprises a projection unit using which the working point to be machined is already able to be recognized and marked when the machining tool is brought close to the working area.

In one exemplary embodiment, the device comprises a simulation system using which the at least one working area for generating the at least one image, the sensor data and/or the at least one classifier is able to be simulated. By way of example, the simulation system for the evaluation unit may simulate a working area for training purposes. To this end, the simulation system may make available at least one image and/or sensor data to the evaluation unit. The evaluation unit may then generate at least one classifier from the at least one image and/or the sensor data. In one variant, the simulation system derives the at least one classifier from the at least one simulated image and/or the sensor data. The at least one classifier may then be made available to identify the at least one working area. By way of example, the at least one classifier may be made available to the evaluation unit and/or transmitted to a classifier memory (classifier repository). The simulation system may in particular simulate a 3D model of the at least one working area and make it available to the evaluation unit for training purposes. To this end, the simulation system may comprise a computer-aided design system (CAD system). The 3D model of the at least one working area may depend on the computing model. The 3D model of the at least one working area may in particular be selected on the basis of a machine learning method.

Working areas of objects may be able to be learned (virtually) by way of the simulation system, that is to say optionally before the object is present in physical form. A multiplicity of variants of working areas may likewise be able to be learned virtually. In one refinement, the simulation system may simulate different perspectives of the image-capturing device. Different perspectives of the image-capturing device may for example be different viewing angles of the at least one camera of the image-capturing device. Perspectives that differ from the training may for example arise on the basis of a change of the tool component, for example use of an extension. The at least one classifier may be able to be regenerated for a different perspective by way of the simulation system.

In one refinement, the at least one working area is able to be simulated using the simulation system during the action of the machining tool on the at least one working area, that is to say in real time. The simulation in real time may make it possible to adapt the computing model, in particular the generation of additional classifiers, during machining of the working area.

In one variant, the at least one classifier is able to be called by the simulation system in particular for selected working areas and/or working points, in particular important screwing points (A and B screwing operations). By way of example, the at least one classifier is able to be called by way of an app of the evaluation unit.

In one exemplary embodiment, the image-capturing device, in order to generate images of the at least one working area, comprises a mobile terminal, in particular a mobile device, a mobile telephone or a smartphone. The mobile terminal may be able to be arranged on the machining tool. This of course does not exclude the image-capturing device comprising at least one further camera for generating images of the at least one working area. In addition or as an alternative, the mobile terminal may comprise at least one sensor. The at least one sensor of the mobile terminal may for example determine a position, absolute position and/or a location of the machining tool in order to generate sensor data. In order to transmit the images and/or the sensor data, the mobile terminal may be connected to the evaluation unit.

In one variant, the mobile terminal generates sensor data that represent a state of the machining tool, in particular screwdrivers and screwing data. A state of the machining tool may for example comprise a consumed power, activation and deactivation data, a torque, a screwing time, a screwing curve, a rotational speed, an angle in relation to the object and/or other settings of the machining tool. The screwing curve may for example be a ratio of a torque of the machining tool on a screw to a rotated angle of the screw or to a screwing time. The mobile terminal, in order to generate the sensor data, may be connected to the machining tool, for example wirelessly, in particular by way of WLAN.

In a further exemplary embodiment, the mobile terminal may receive classifiers from the classifier memory and use them to identify the at least one working area on the basis of the generated images and sensor data.

In one exemplary embodiment, the generated images and sensor data are able to be stored in connection with an identifier of the machined object and/or machined working area. The object or the working area may be able to be identified uniquely on the basis of the identifier. The images and sensor data may thus be able to be used over the long term for quality evaluation. The quality evaluation may in particular allow statistical analysis of service subsidiaries and service personnel.

In one exemplary embodiment, the evaluation unit is designed, in a sequence of a multiplicity of known images and/or known sensor data containing at least one unknown image and/or at least one section of unknown sensor data, to recognize the at least one unknown image and/or the at least one unknown section of sensor data. A sequence of known images may be for example an image sequence during machining of the object within which the evaluation unit recognizes all of the images. Recognition may mean that the probability level of the identification is above a certain threshold. The threshold may for example be 0.75 or 0.95. The evaluation unit may recognize the images in particular when the images were learned beforehand during training. The at least one unknown image may for example be an image or an image sequence that has not previously been learned during training. The same applies to a sequence of known sensor data. The duration of a section of unknown sensor data may in this case be shorter than the duration of the previous and following known sensor data.

In one exemplary embodiment, the evaluation unit may furthermore be designed to be trained by way of machine learning to identify the at least one known working area on the basis of the at least one unknown image and/or the at least one section of unknown sensor data. The at least one unknown image and/or the at least one unknown section of sensor data may in particular be used to generate at least one classifier. This may be achieved by incorporating the at least one unknown image and/or the at least one unknown section of sensor data into the data pool for the next classifier run. At least one classifier may be generated or improved in a classifier run from the data pool. The probability of identification of the working area may thereby be increased.

In other words, the at least one classifier may be continually improved during operation of the device. To this end, the device may compile images for post-training during operation.

In a first variant, the computing model is designed to be self-trained. This is achieved through unsupervised learning, that is to say without an expert. In this case, the at least one image may be used for post-training. The requirement for this is that the at least one working area has been identified by the computing model with a high probability level, for example a probability level above 0.75, on the basis of the at least one image. That is to say in principle any image for which the classifier is able to make a prediction with high reliability may be used for post-training. It is assumed in this case that the prediction was correct. As a result of the computing model training itself, the overall probability level of correct identification of a multiplicity of working areas is able to be increased. That is to say, the overall reliability of predictions should increase further over time.

In a second variant, the computing model is designed to be trained by a user. This is achieved through supervised learning, that is to say with the aid of an expert. In this case, the at least one image may be used for post-training. The requirement for this is that the at least one working area has been identified by the computing model with a low probability level, for example a probability level below 0.45, on the basis of the at least one image. In contrast to the first variant, images are thus compiled for which the classifier has a high uncertainty with regard to the prediction. A user may train the computing model by specifying the identification of the at least one working area to recognize the at least one working area on the basis of the at least one image. The at least one image is thus post-labeled by an expert, that is to say the correct recognition is assigned, and may then be used for post-training.

Of course, in both variants, sensor data may be used for post-training instead of or else in addition to the at least one image.

The evaluation unit may in principle also be designed to recognize at least one unknown combination of at least one image and at least one section of sensor data. It is conceivable and possible in this case for the at least one image and the at least one section of sensor data to each be known. The evaluation unit then may furthermore be designed to be trained by way of machine learning to identify the at least one known working area on the basis of the at least one unknown combination.

In one exemplary embodiment, provision is made for a supervision unit that is designed to document a sequence of working areas that have been machined by the machining tool. The supervision unit may thus document which working areas have been machined and the order in which the working areas have been machined. The supervision unit may additionally document a tool component that is used, a component that is used, such as for example a screw that is screwed in, the at least one image and/or the sensor data. The use of a component may be able to be documented by the supervision unit, for example in order to schedule the logistics of components or as proof of use. In addition to documenting the component that is used, the absolute position and/or the surroundings of the component may be documented.

In one variant, the supervision unit is designed to specify a sequence of working areas and/or working points to be machined by the machining tool. The supervision unit may in particular be designed to group together at least two working areas in a sequence of working areas to be machined by the machining tool. By way of example, the supervision unit may group together working areas or, for one working area, working points that should be machined with a tool component and/or identical states of the machining tool, such as angles in relation to the object or torque.

In one refinement, the supervision unit may assign incorrectly machined working areas during the machining of a working area or following machining of the multiplicity of working areas or a group of the multiplicity of working areas. The supervision unit may possibly specify incorrectly machined working areas for renewed machining. The supervision unit may likewise be able to recognize an incorrect order in the machining of working areas.

In order to document the machined working areas and/or working points, the supervision unit may be connected to the machining tool, the image-capturing device, the at least one sensor and/or the evaluation unit in order to exchange data, for example via radio or cable.

In one exemplary embodiment, provision is made for a control unit that is connected to the machining tool, the supervision unit and/or the evaluation unit and using which the machining tool is able to be controlled. States of the machining tool, such as a rotational speed or a torque, may be able to be adjusted by way of the control unit. States of the machining tool may of course be able to be adjusted automatically by way of the device on the basis of the identified working area. With dynamic recognition of the working point that is currently to be machined, it is possible to adjust the state of the machining tool in real time. Working points and/or working areas having the same requirements in terms of the state of the machining tool may thus also in particular be able to be grouped together by way of the supervision unit.

In a further exemplary embodiment, provision is made for a signaling device for outputting a signal to a user of the machining tool. The signal may be able to signal to the user that at least one working area has not been recognized, at least one working area has been machined incorrectly and/or at least one working area in a sequence of working areas has not been machined. The signaling device may possibly signal to a user of the machining tool the requirement for subsequent work on at least one working area. The signaling device may likewise signal to the user that the evaluation unit is not able to identify a working area. In one variant, the signaling device signals to the user a result of a determination by the evaluation unit and/or supervision unit. The signaling device may thus in principle serve to output signals from the supervision unit and/or the evaluation unit to the user. In one embodiment in which the evaluation unit has determined that a tool component has already been used for longer than the prescribed usage time, the signaling device may for example output a signal that the tool component should be exchanged.

The signal may for example be output on the machining tool. By way of example, the signal may be a sound, a light or a vibration. Any signals are of course conceivable and possible.

In one exemplary embodiment, the device comprises a test working area for calibrating the device. A user may for example calibrate the image-capturing device and in particular the at least one camera by way of the test working area. The evaluation unit may be designed to automatically recognize that calibration is necessary. The test working area may likewise be designed to recognize damage and/or soiling on the machining tool. In order to recognize damage and/or soiling, a standard machining routine may be performed on the test working area. Deviations in the at least one image and/or the sensor data from the expected at least one image and/or the expected sensor data may indicate damage and/or soiling. A possible sequence may comprise one or the following steps: 1. Approach the test working area. 2. Check the function of the machining tool. 3. Calibrate the machining tool. 4. Focus the image-capturing device on the test working area. 5. Recognize soiling and/or damage. 6. Rectify soiling and/or damage.

In one exemplary embodiment, the device comprises at least one interface that is intended for connection to another system. Information may be able to be exchanged between the device and the other system via the interface. By way of example, the interface may be designed as an application programming interface (API). The device may in particular be able to be reached remotely, for example from a server or a mobile device, by way of the interface. The device may likewise be able to be administered or controlled centrally, for example by a server, by way of the interface.

In a further refinement, the machining tool comprises a display for displaying context information, for example of the at least one image, the sensor data and/or parameters, settings or states of the machining tool for the user, in particular following recognition of the at least one working area.

In one exemplary embodiment, use of the device may comprise the following respectively optional steps: In a first step, a person brings the object, for example a motor vehicle, to an authorized workshop. The person requires the object to be repaired (guarantee or critical component). In a second step, the authorized workshop uses the device to report the repair to a server, for example a server of an OEM network. In a third step, the authorized workshop possibly procures a required component, for example a replacement part for the object. The authorized workshop furthermore obtains clearance for the repair. In a fourth step, the device receives at least one classifier via the interface from the server, this optionally being loaded into the classifier memory. The device may in principle receive data for monitoring and/or ensuring correct machining.

In a fifth step of the exemplary embodiment, the machining of the object begins—for example installation or repair. The machining tool is provided for this purpose. The machining tool is known to the OEM, connected to the server via the interface and/or has received OEM clearance. In a sixth step, the at least one classifier is loaded. The at least one classifier is in this case made available to the evaluation unit. The at least one classifier may be specific to the motor vehicle of the person. In a seventh step, a user of the device, for example a workshop colleague, arranges the image-capturing device on the machining tool. The image-capturing device may be for example a mobile camera or a mobile telephone. In an eighth step, the user machines the object using the machining tool with predefined values, that is to say for example a predefined state and/or predefined situations. The machining is optionally documented via the supervision unit by way of the machining tool, in particular the image-capturing device and/or the at least one sensor (able to be recognized in the surroundings by the classifier). In a ninth step, the data for monitoring and/or ensuring correct machining are compared with the at least one image and/or the sensor data by the evaluation unit and/or supervision unit. If the data and images match, this is proof of successful machining.

In one variant, the at least one classifier is intended to perform a diagnosis on the object. A defective point on the object may for example be able to be identified by way of the at least one classifier.

In a further variant, the at least one classifier may be optimized through up-to-date diagnostic values. By way of example, when establishing an incorrect or unlearned point on at least one working area of the object, the at least one working area may be able to be post-learned.

In an additional variant, the OEM may make available at least one currently valid classifier on the basis of a unique identification number of the object, in particular of the motor vehicle, via the interface, for example via an intranet connection.

The system may in principle also be used for general diagnostics. A learned working area containing at least one structure, for example on a motor vehicle, may be used to check for problems, such as missing, displaced and/or defective components. By way of example, in the case of a test run with a motor vehicle in which a problem is suspected, the image-capturing device may be oriented at an area that possibly has a problem. The area may be visually inspected under driving conditions during the test run by way of the image-capturing device. In one refinement, the device may likewise capture components that are deformed under wind load and/or acceleration and other external influences, in particular during the test run. Impermissible deformations, for example caused by damage, may be able to be detected by way of the device. The deformations may furthermore be able to be recorded and documented.

A method according to the proposed solution may in this case of course be used using a device proposed according to the solution, such that advantages and features of variant embodiments of such a device as mentioned above and below also apply to variant embodiments of a proposed method, and vice versa.

BRIEF DESCRIPTION OF THE DRAWINGS

Exemplary embodiments are illustrated by way of example below.

FIG. 2B shows the generation of a classifier;

FIG. 3B shows a device having a simulation system;

FIG. 6A shows a machining tool having an image-capturing device with an illumination device;

FIG. 14 shows a perspective view of a machining tool in one embodiment in the form of an industrial screwdriver for machining a vehicle;

DESCRIPTION OF THE INVENTION

Figure 1:
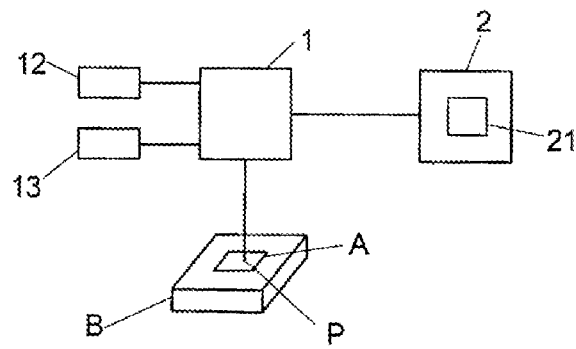
FIG. 1 shows a device for machining at least one working area of an object.

FIG. 1 shows a device having a machining tool 1 for machining a working area A of an object B. The working area A extends over a surface of the object B. In the variant embodiment that is shown, the working area A is of rectangular design. Any shape of the working area A is conceivable and possible in principle. A working point P is arranged within the working area A and is interacted with by the machining tool 1. The machining tool 1 may be for example an installation screwdriver, a torque wrench or another tool. The object B may be machined for example for installation or repair purposes.

An image-capturing device 12 for generating at least one image 121 of the working area A of the object B is arranged on the machining tool 1. A sensor 13 for generating sensor data 131 is also arranged on the machining tool 1. The device furthermore comprises an evaluation unit 2 having a computing model 21.

Figure 2A:
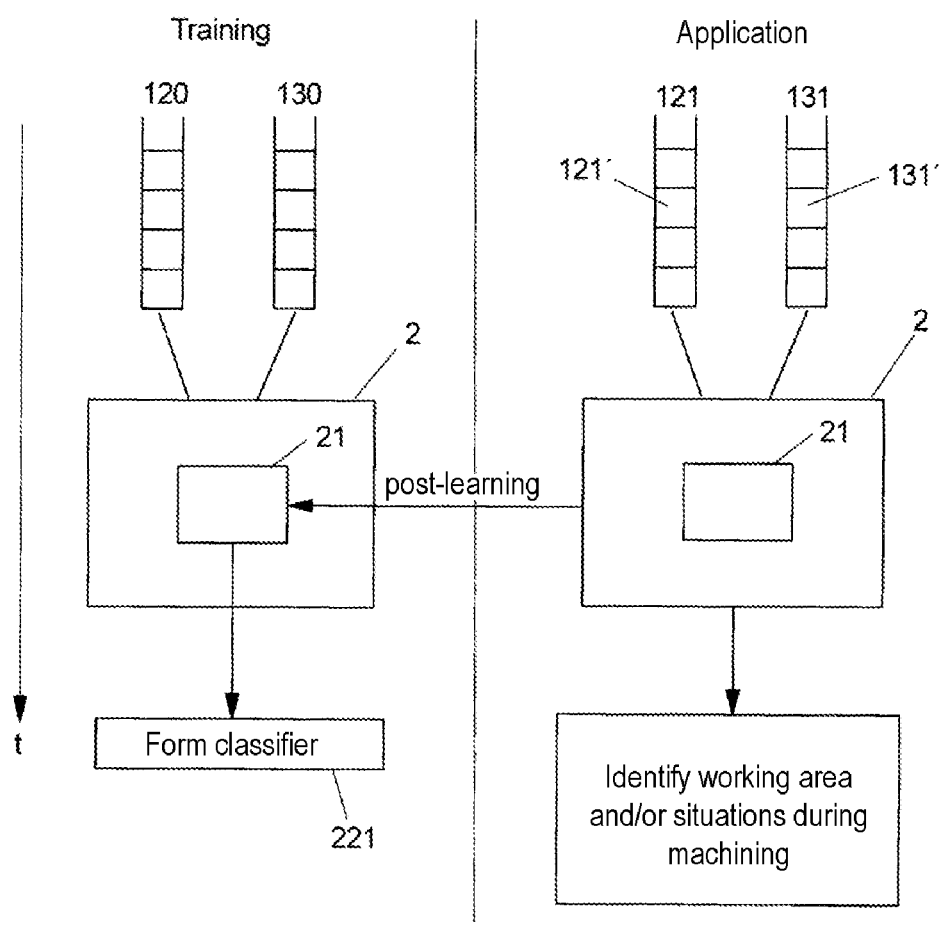
FIG. 2A shows the training of a computing model and application of the computing model.

The computing model 21 is trained by way of machine learning on the basis of images 120 of working areas A and sensor data 130, as shown in FIG. 2A. A working area A is able to be identified by the computing model 21 during machining of the working area A on the basis of an image 121 of the working area A. The working area A may of course be able to be identified by the computing model 21 before machining, for example when the machining tool 1 approaches the working area A. The working area A may likewise be able to be identified on the basis of sensor data 131. The working area A may in particular be able to be identified via a position, an acceleration or an absolute position of the machining tool 1 in space. To this end, the sensor 13 may for example be designed as a position sensor, an acceleration sensor or an absolute position sensor. The working area A may also be able to be identified via an acoustic profile, that is to say the profile of an acoustic signal over time. The working point P may in particular be able to be identified on the basis of the sound that arises when placing the machining tool 1 on the working point P. To this end, the sensor 13 may be designed as an acoustic sensor. The working area A may additionally also be able to be identified on the basis of a combination of at least one image 121 and sensor data 131.

A situation during machining of the at least one working area A is also able to be identified using the computing model 21. A situation may be characterized by features of the machining tool 1, such as a state, in particular a torque, sensor data 131 and images 121 of the working area A on its own, in combination or together during machining of the at least one working area A.

During training, the computing model 21 forms classifiers 221, 222, 231, 232 based on sensor data 130, images 120 and/or features, such as a state, of the machining tool 1. FIG.

2B shows the formation of a classifier 221 based on an image 120. The image 120 shows a working area A that is machined by a machining tool 1, wherein a tool component 11 interacts with the working area A. In a first step S1, the computing model 21 extracts features and forms a feature assignment. The features are weighted and compressed in a second step S2. From the result of the weighting and compression, the computing model 21 forms a feature vector in a third step S3. The feature vector serves to generate the classifier 221.

During application, shown in FIG. 2A, the computing model 21 resorts to the images 120 and sensor data 130 learned during training, in particular to the classifiers 221, in order to identify the working area A and/or a situation on the basis of the images 121 and sensor data 131. In one variant, the computing model 21 additionally takes into consideration combinations of images 121 and sensor data 131. The identification of a working area A on the basis of the at least one image 121 may then depend on the sensor data 131. By way of example, a position or absolute position of the machining tool 1, determined during training, may be necessary in order to identify the at least one working area A on the basis of the at least one image 121. Incorrect or wrong positions and/or absolute positions of the machining tool 1 may thereby in particular be able to be ascertained. In one variant, the evaluation unit 2 may specify permitted positions and/or absolute positions of the machining tool 1 for a user, for example via a signaling device 5. The computing model 21 may furthermore post-learn the incorrect positions and/or absolute positions, for example in response to an input from the user.

The computing model 21 may also resort to formed or imported classifiers in other ways, for example on another evaluation unit, in order to identify the working area A and/or a situation on the basis of images 121 and sensor data 131. The computing model 21 may additionally be designed to post-learn a working area A or a situation from a context from unknown images 121' and/or unknown sensor data 131'. A context may for example be a sequence of known images 121 and/or known sensor data 131 containing unknown images 121 and/or sensor data 131. After an unknown image 121' and/or unknown sensor data 131' from a working area A or a situation have been post-learned by the computing model 21, the working area A or the situation is able to be identified by the computing model 21.

Figure 2C:
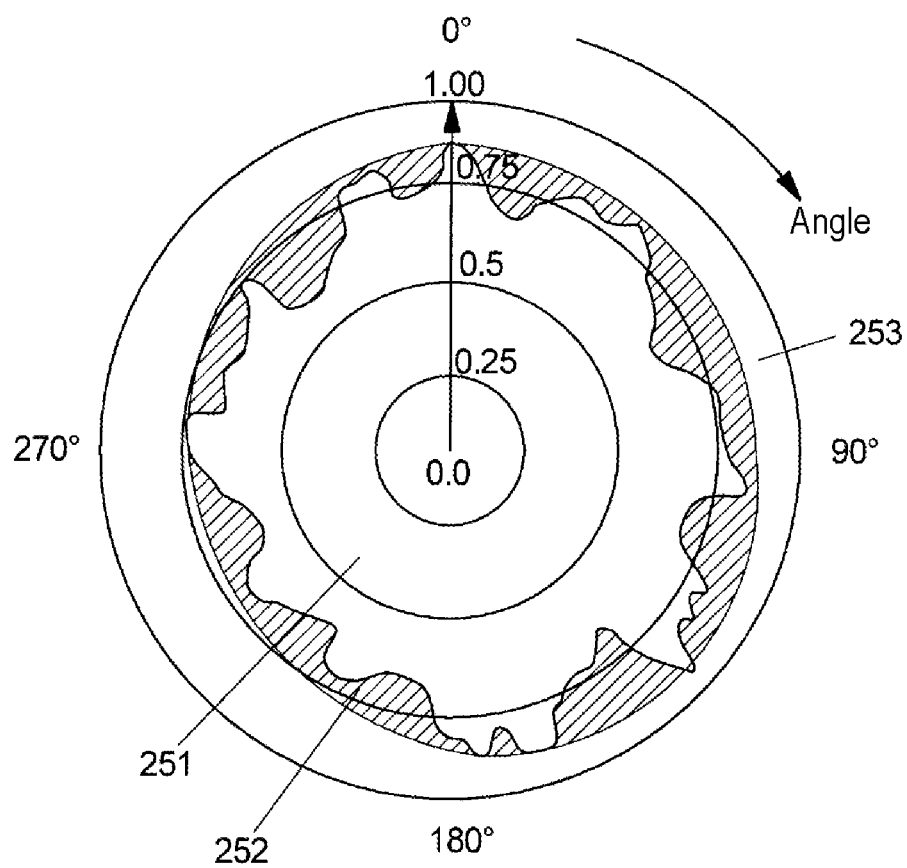
FIG. 2C shows the confidence of a working area being able to be identified at an angle of the machining tool.

FIG. 2C shows an assignment of an angle of the machining tool 1 between 0° and 360° in relation to the working area A to a probability level that indicates the confidence with which the working area A is identified by the computing model 21 on the basis of at least one image 121. The angle should in this case be considered representative of any parameters, and in particular any state and/or any situation. It is of course also conceivable and possible to perform such an assignment for sensor data 131. The following explanations therefore likewise apply to sensor data 131 and to combinations of sensor data 131 and images 121.

An inner area 251 indicates the probability level that previously recorded images have achieved. A central area 252 indicates what probability level would potentially be able to be achieved for the at least one image 121. An outer area 253 indicates what probability level would be able to be achieved as a maximum in theory. The at least one image 121 is captured at a particular angle. When previously recorded images that, at an angle of the machining tool 1 that is adjacent to the determined angle, achieve a higher probability level than the at least one image 121, the at least one image 121 is used to train the computing model 21. The at least one image 121 may in particular be adopted into a data pool for the next classifier run (pool of reference images). By way of example, provision may be made for a difference threshold that indicates how much higher the probability level of the previously recorded images has to be in comparison with the at least one image 121 in order to use the at least one image 121 to train the computing model 21. In one embodiment, the difference threshold may be 0.25. The probability level of the at least one image 121 in comparison with the potentially or theoretically maximum achievable probability level may likewise be used as a basis for determining whether the at least one image 121 should be used to train the computing model 21. The difference threshold is then relative to the potentially or theoretically maximum achievable probability level.

Figure 3A:
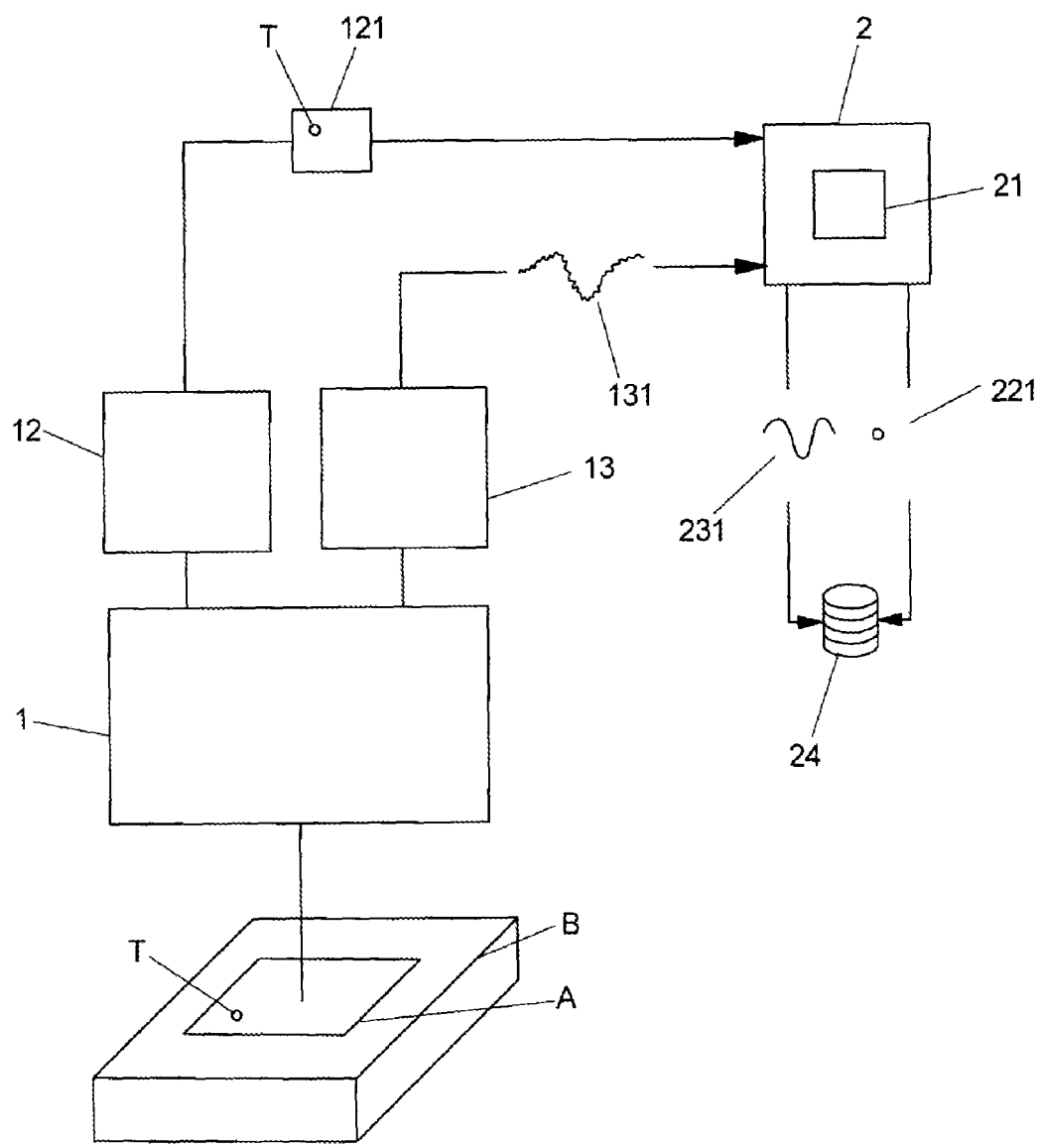
FIG. 3A shows a device having a classifier memory.

In the image-capturing device 12 illustrated in FIG. 3A, the generated image 121 shows the working area A during machining by the machining tool 1. A circular component T may be identified therein. The image 121 may likewise show any other section of the object B. The image 121 may in particular show a section of the object B that will provisionally be machined by the machining tool 1, or that has been machined by the machining tool 1.

A sensor 13 for generating sensor data 131 is furthermore arranged on the machining tool 1. The sensor data 131 show a superimposition of two waveforms having different frequencies. The sensor 13 may of course generate the sensor data 131 at any time. The sensor 13 may in particular generate sensor data 131 before processing of the working area A by the machining tool 1 or after processing of the working area A by the machining tool 1.

The device furthermore comprises an evaluation unit 2. The evaluation unit 2 receives images 121 and sensor data 131 from the image-capturing device 12 and the sensor 13, respectively, for evaluation. To this end, the evaluation unit 2 is connected to the image-capturing device 12 and the sensor 13. The evaluation unit 2 may of course receive the images and sensor data 131 via radio or via another transmission method. In one variant, the evaluation unit 2 is arranged on the machining tool 1.

The evaluation unit 2 has a computing model 21 that is designed to generate a respective classifier 221, 231 from the images 121 and/or the sensor data 131. The classifiers 221, 231 each represent at least one essential feature of the images 121 and/or of the sensor data 131. For the sake of illustration, the evaluation unit 2 generates a sheet as classifier 221 for the image 121. For the sensor data 131, the superimposition of two waveforms, the evaluation unit 2 in FIG. 3A selects the waveform having the lower frequency as classifier 231. The generation of the classifier depends in principle on the computing model 21. The illustrated examples serve merely for illustration.

The classifiers 221, 231 generated by the evaluation unit 2 may be stored in a classifier memory 24. In order to identify the at least one working area A and/or a situation during machining of the at least one working area A (application), the classifiers 221, 231 are able to be called from the classifier memory 24 by the evaluation unit 2 and/or the machining tool 1. To this end, the classifier memory 24 may be connected to the machining tool 1, for example wirelessly.

In FIG. 3B, a simulation system 6 is connected to the evaluation unit 2. The simulation system 6 simulates the working area A. It may be used to generate classifiers 222, 232. The simulation system 6 may likewise be used to make simulated images 120' or sensor data 130' available to the evaluation unit 2. The simulated images 120' or sensor data 120' may be used by the computing model 21 to generate classifiers 222, 232. The simulation system 6 may in particular be connected detachably to the evaluation unit 2. In one variant, the simulation system 6 may be connected to the evaluation unit 2 for training purposes and dispensed with during application.

The simulation system 6 in FIG. 3B furthermore generates a classifier 222 that is able to be used to identify a working area A containing a rectangular component T. A further classifier 232 generated by the simulation system 6 is able to be used to identify sensor data having a square waveform. The classifiers 222, 232 generated by the simulation system 6 may be stored in the classifier memory 24. The simulation system 6 may of course generate classifiers 222, 232 for any working areas A and/or situations. The classifiers 222, 232 may in particular be able to be generated in real time by the simulation system 6, that is to say for example during machining of the working area A by the machining tool 1. The simulation system 6 may for example be used to ensure that variants of working areas A or objects B are able to be identified by the evaluation unit 2, these not having been learned on the basis of images 120 of working areas A and sensor data 130.

Figure 4:
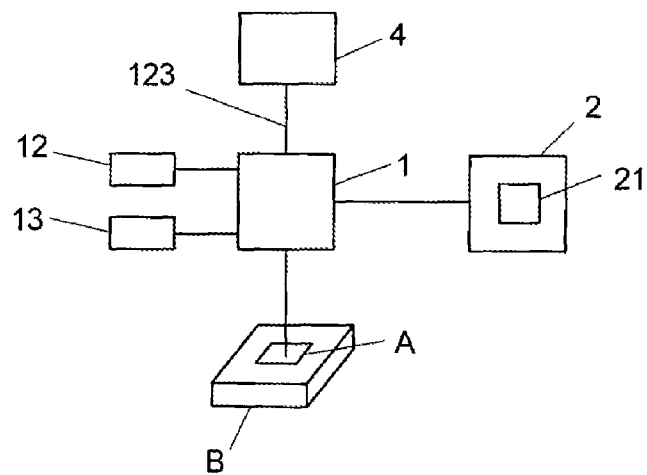
FIG. 4 shows a device having a control unit.

In the exemplary embodiment shown in FIG. 4, the device comprises a control unit 4 for controlling the machining tool 1. The control unit 4 is for this purpose connected to the machining tool 1 by way of a cable 123. The control unit 4 may of course be connected to the machining tool 1 wirelessly, integrally or in another way. The control unit 4 may in particular also be connected to the machining tool 1 via the evaluation unit 2. The control unit 4 may likewise be connected to the machining tool 1 and the evaluation unit 2.

Figure 5:
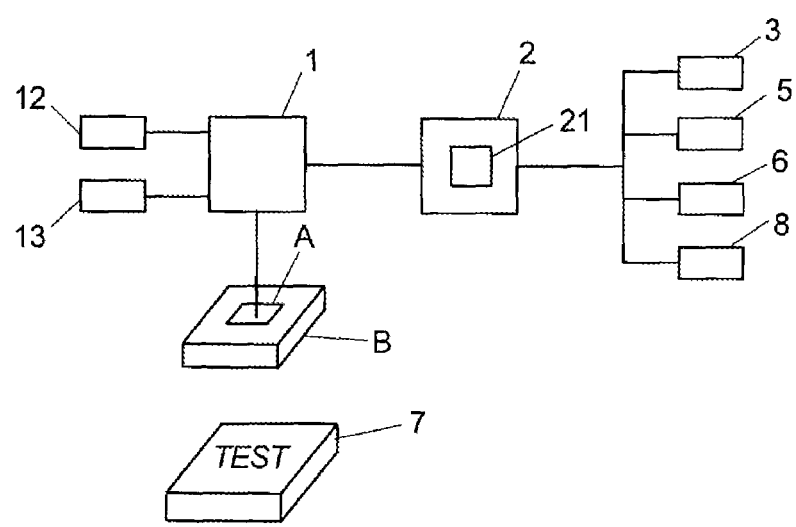
FIG. 5 shows a device having a supervision unit, a signaling device and a simulation system.

The device in FIG. 5 comprises, in addition to a simulation system 6, a supervision unit 3 that is designed to document and/or to log the working areas A that have been machined by the machining tool 1. The supervision unit 3 may for this purpose store a sequence of working areas A that have been machined by the machining tool 1. The supervision unit 3 is connected to the evaluation unit 2. The evaluation unit 2 thus forwards information about the machined working areas A to the supervision unit 3. The control unit 4 may likewise be connected to the supervision unit 3. The control unit 4 may thus forward information about the machined working areas A to the supervision unit 3.

A signaling device 5 is also connected to the evaluation unit 2. The signaling device 5 may for example be arranged on the machining tool 1. The signaling device 5 may also be arranged on another component of the device or be designed separately as an independent unit. The signaling device 5 may likewise be integrated into a component of the device, for example the evaluation unit 2. A signal is able to be output to a user of the machining tool 1 by way of the signaling device 5. The signal serves for example to signal to the user that the evaluation unit 2 has identified a fault. A fault may be for example the machining of an incorrect working area A, the incorrect machining of a working area A and/or the machining of working areas A in an incorrect order.

A test working area 7 serves to calibrate the device. It may for example be necessary to calibrate the device in order to increase the probability of identification of a working area A. It may for example be able to be checked on the test working area 7 whether the image-capturing device 12 is operating correctly. The image-capturing device 12 is in particular able to be calibrated by way of the test working area 7.

The image-capturing device 12 may generate images by way of at least one camera. To this end, the image-capturing device 12 may be arranged on a side of the machining tool 1 that faces the working area A during machining of the working area A by the machining tool 1, as shown in FIG. 6A. The image-capturing device 12 may of course be arranged at any point on the machining tool 1. The image-capturing device 12 may in particular comprise a multiplicity of cameras that are arranged at different points on the machining tool 1. By way of the multiplicity of cameras, it may be possible to generate images of surroundings of the machining tool 1, of one or more working areas A and/or of various perspectives of a working area A and/or of surroundings of the working area A using the image-capturing device 12.

The image-capturing device 12 comprises a lens 122 whose optical axis O intersects a working point P on which the machining tool 1 machines the working area A. The working point P may thereby be arranged in the center of the image generated by the image-capturing device 12. It is of course also conceivable for the working point P to be arranged at any point in the image. In order to adjust the section of the object B that is shown in the image, the image-capturing device 12 may be adjustable in relation to the machining tool 1. It is also conceivable and possible for the image-capturing device 12 to be designed to zoom in and zoom out on a working area A. To this end, the image-capturing device 12 may comprise at least one camera having a zoom lens.

Figure 7:
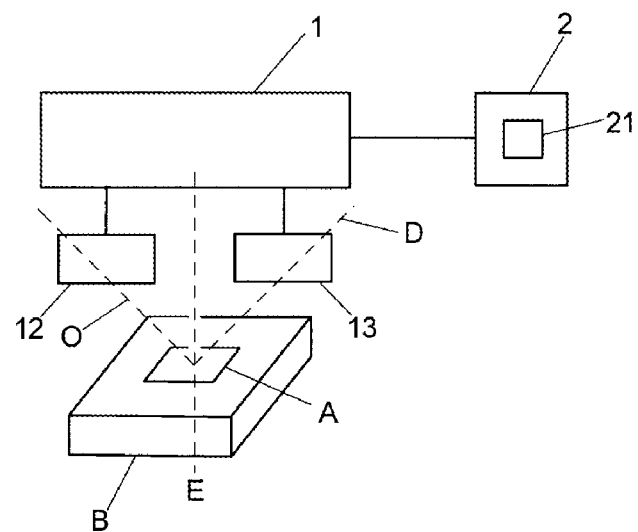
FIG. 7 shows a device having an optical axis and detection axis.

The optical axis O may in principle intersect an action axis E along which the machining tool 1 acts on the working area A, as shown in FIG. 7. In the exemplary embodiment shown in FIG. 8, the optical axis O extends parallel to the action axis E.

Figure 6B:
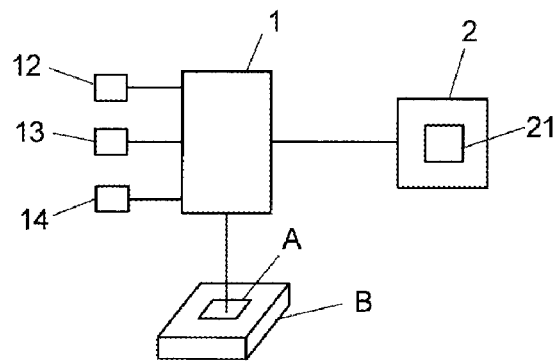
FIG. 6B shows a device having an illumination device.

An illumination device 14 is arranged on the image-capturing device 12 and illuminates the working area A and part of the machining tool 1. The illumination device 14 for this purpose outputs light substantially along the optical axis of the image-capturing device 12 in the direction of the working area A. The light from the illumination device 14 in particular illuminates the working point P. The illumination device 14 may of course output light of any wavelength in any direction. It is likewise conceivable and possible for the illumination device 14 to be arranged at another point of the machining tool 1, as shown in FIG. 6B, and in particular on the at least one sensor 13. The illumination device 14 may comprise a multiplicity of light sources that are arranged at different points of the machining tool 1 and output light in any direction. The illumination device 14 may output light constantly, output light during machining of the working area A by the machining tool 1 or output light synchronously with the capturing of at least one image by the image-capturing device 12 and/or the generation of sensor data by the at least one sensor 13.

The sensor 13 is arranged on a tip of the machining tool 1 that faces away from the user, in particular the tip of the machining tool 1. The sensor 13 may in principle be arranged, that is to say integrated, at any point of the machining tool 1, and in particular within the machining tool 1. A detection axis D of the sensor 13 may intersect the working point P on the working area A, as shown in FIG. 7. The detection axis D may in principle extend along a direction in which the sensor 13 generates the sensor data 131 with the greatest accuracy. By way of example, in the case of a sensor 13 that is in the form of a microphone, the detection axis D may extend perpendicular to an aperture of the microphone.

Figure 8:
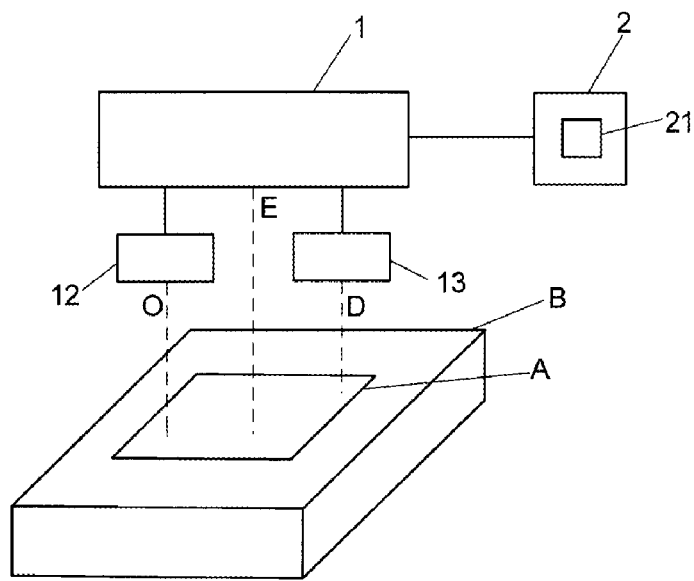
FIG. 8 shows a device having an optical axis and a detection axis parallel to an action axis.

The detection axis D may in particular also extend parallel to the action axis E, as shown in FIG. 8. The detection axis D may in principle extend in any direction. It is of course also conceivable and possible for the at least one sensor 13 to generate sensor data 131 in multiple directions with the greatest accuracy.

Figure 9:
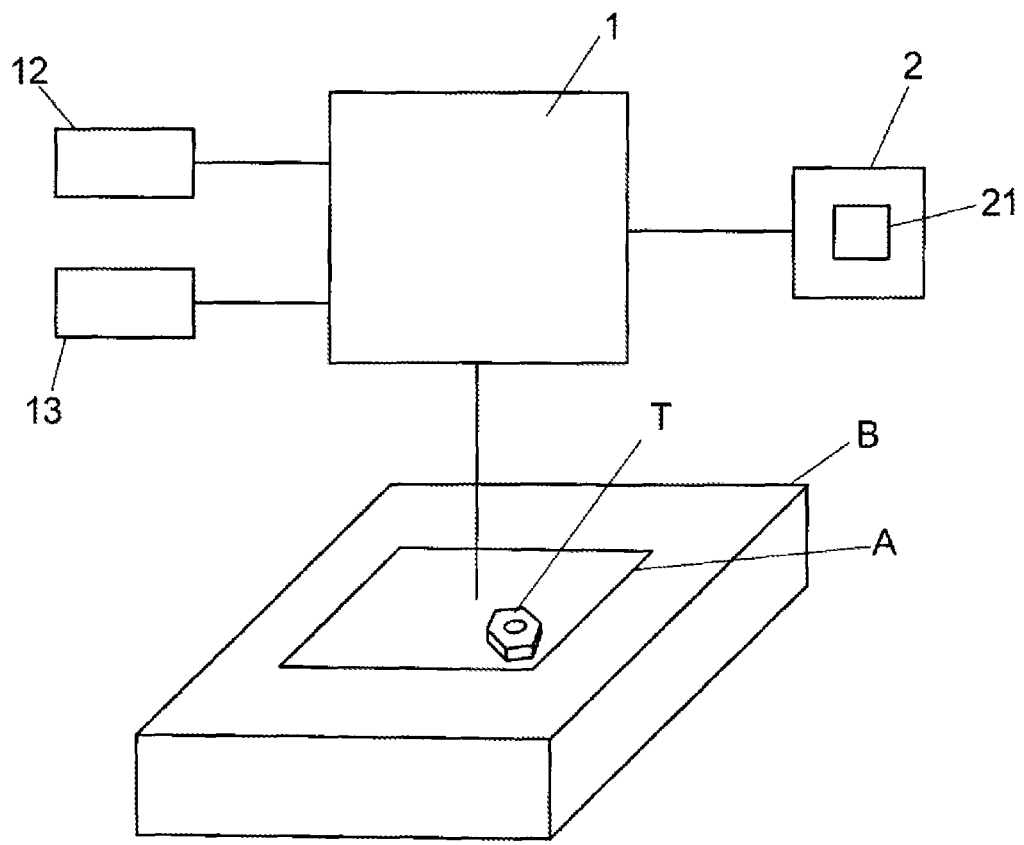
FIG. 9 shows a device for determining a component.

FIG. 9 shows a working area A containing a nut T. Such a component T is able to be determined by the evaluation unit 2. The position of the component T is in particular able to be determined by the evaluation unit 2. Any component T may in principle be able to be determined by the evaluation unit 2. The absence, that is to say the lack of presence, of a component T or a defective component T may additionally be able to be recognized by the evaluation unit 2.

Figure 10:
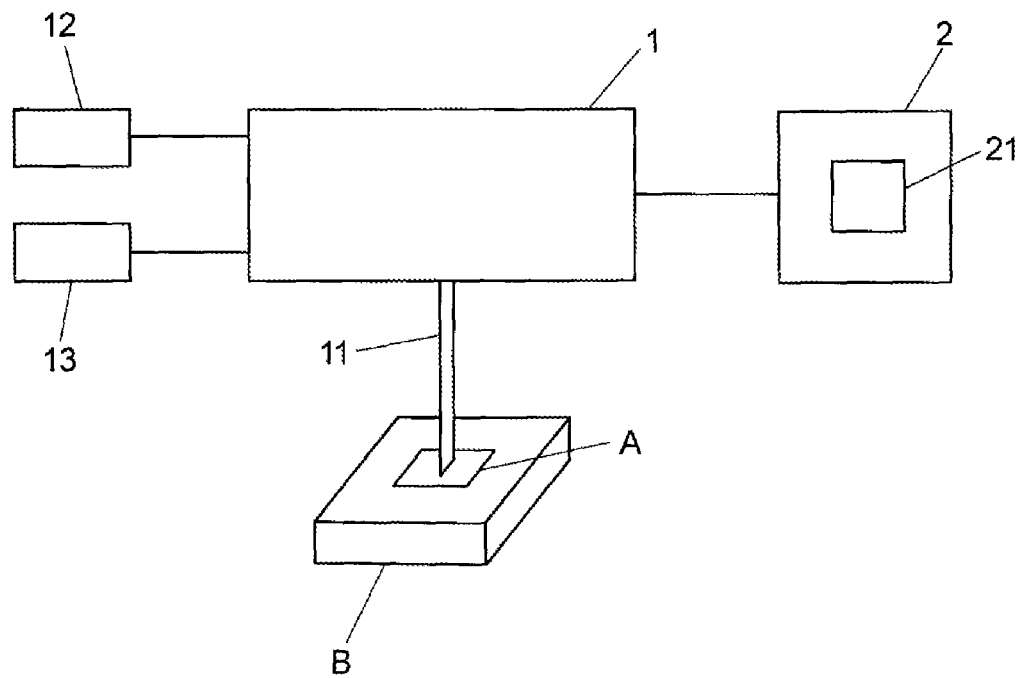
FIG. 10 shows a device having a tool component.

FIG. 10 shows a machining tool 1 having an extension. Such a tool component 11 may be depicted in the at least one image 121. The evaluation unit 2 may then determine the presence of the tool component 11 on the basis of the image. The evaluation unit 2 may likewise recognize an incorrect tool component 11 that is not suitable for machining the working area A. For the recognition by the evaluation unit 2 using the image-capturing device 12, the tool component 11 may for example comprise a marking. The tool component 11 may of course also be able to be recognized by the at least one sensor 13.

Figure 11:
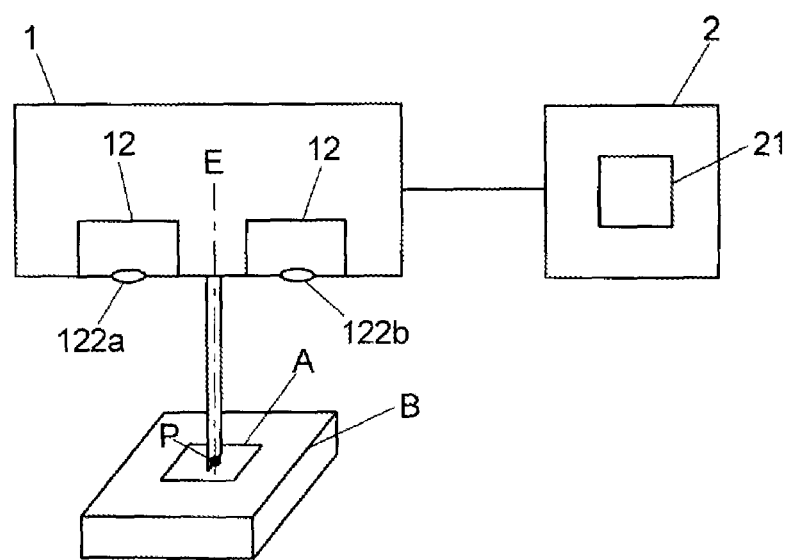
FIG. 11 shows a side view of a device having an image-capturing device with two lenses.

FIG. 11 shows an image-capturing device 12 whose lenses 122a, 122b are arranged annularly around the action axis E. A connecting straight line between two lenses 122a, 122b intersects the action axis E. A multiplicity of lenses may for example be arranged around the action axis E in the shape of a star. A multiplicity of images that are able to be captured by the multiplicity of lenses may make available a multiplicity of perspectives of the working area A. Other arrangements of lenses, for example distributed over a surface of the machining tool 1 or in clusters, are of course conceivable and possible.

Figure 12:
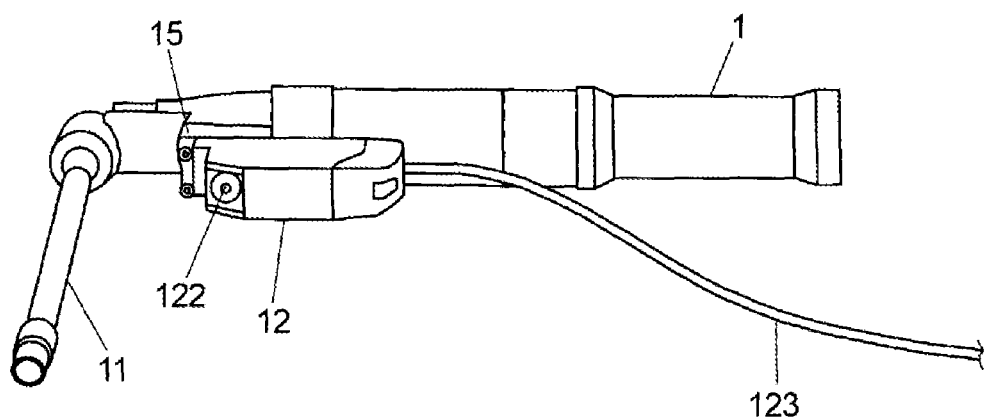
FIG. 12 shows a perspective view of a machining tool in one embodiment in the form of an industrial screwdriver.
Figure 13:
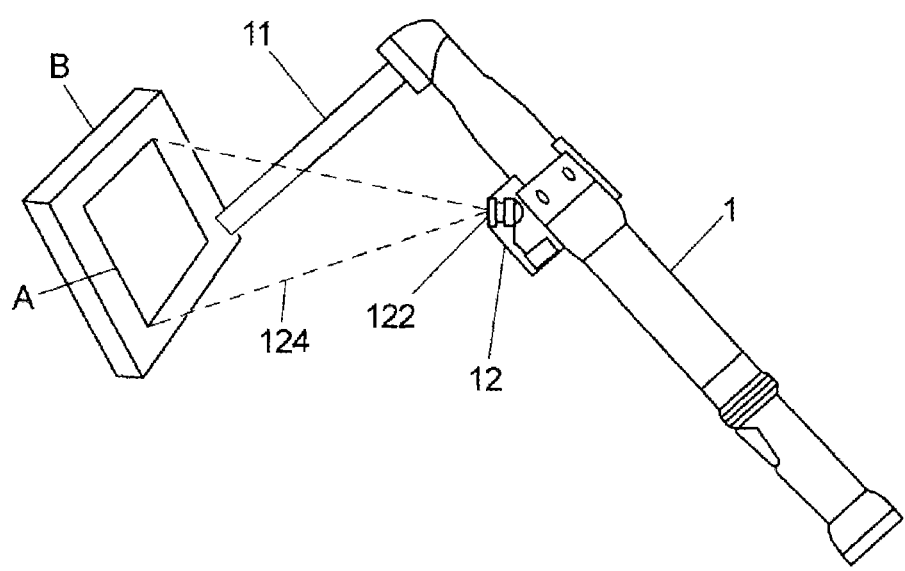
FIG. 13 shows a side view of a machining tool in one embodiment in the form of an industrial screwdriver.

FIG. 12 shows one exemplary embodiment having an industrial screwdriver as machining tool 1. The machining tool 1 comprises an extension as tool component 11. The image-capturing device 12 comprises a camera having a lens 122 and is screwed to the machining tool 1 by way of an adapter 15 on the side of the tool component 11. A cable 123 is provided in order to connect the image-capturing device 12 to the evaluation unit 2. A wireless connection between image-capturing device 12 and evaluation unit 2 is of course likewise conceivable and possible, as shown in FIG. 13.

The image-capturing device 12 generates the at least one image 121 of the at least one working area A in an area within an image-capturing cone 124. The image-capturing cone 124 intersects the tool component 11. The tool component 11 is thus also depicted in the at least one image 121. The image-capturing cone 124 may of course intersect other sections or else no section of the machining tool. The image-capturing cone 124 may in particular be able to be adjusted by way of an adjustable image-capturing device 12.

An image 121 in which the tool component 11 is depicted is shown in FIG. 14. The working point P is arranged in the center of the image 121. The tool component 11, formed by an extension and a bit, extends from the edge of the image 121 into the center toward the working point P. Features of the working area A on the basis of which the evaluation unit 2 identifies the working area A, optionally in combination with sensor data, are depicted by closed shapes and lines. The object B is formed by a vehicle.

Figure 15A:
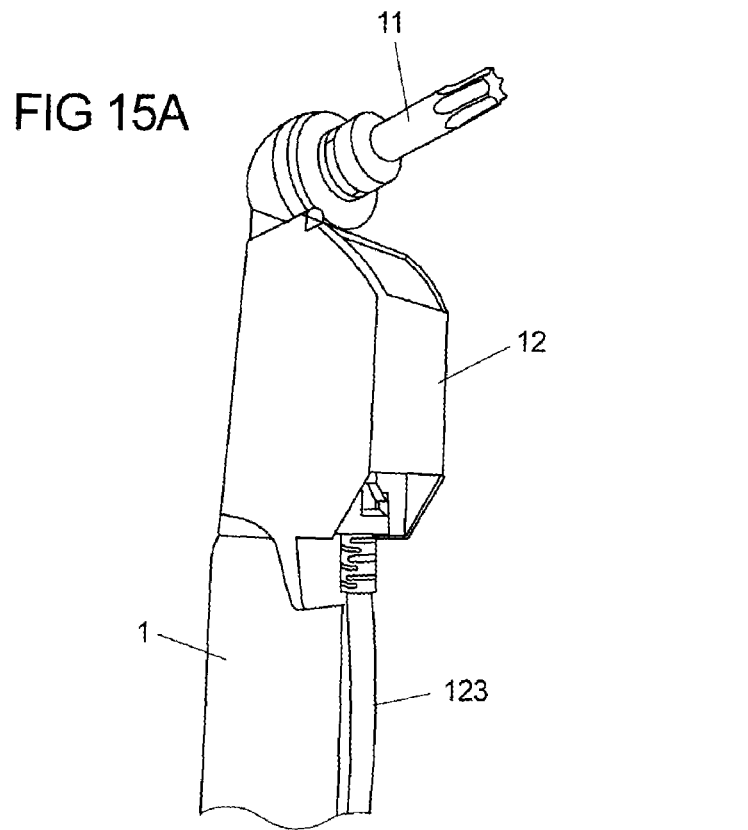
FIG. 15A shows a perspective view of a machining tool in one embodiment in the form of an industrial screwdriver having tool component.
Figure 15B:
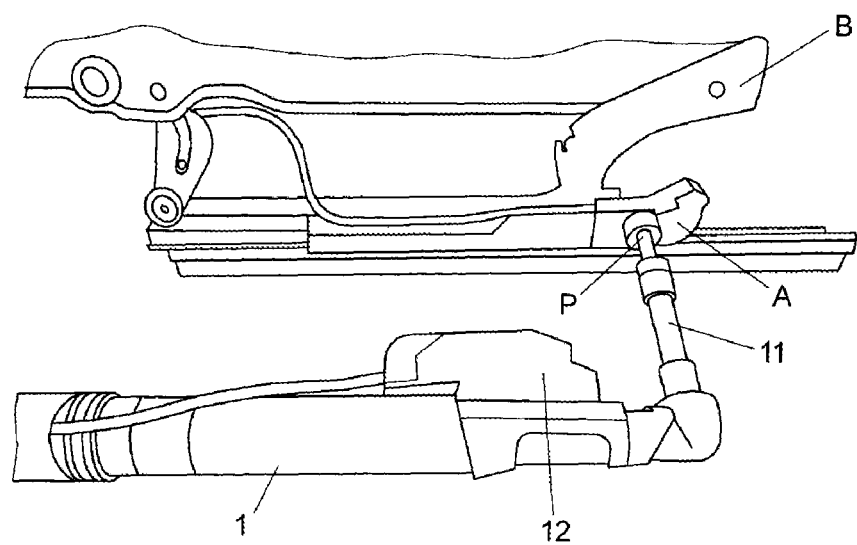
FIG. 15B shows a perspective view of a machining tool in one embodiment in the form of an industrial screwdriver for machining a vehicle seat.

A further exemplary embodiment is shown in FIG. 15A. The tool component 11 is formed by a bit. A component T, formed by a screw, is screwed to an object B, formed by a vehicle seat, at a working point P by way of the tool component 11 in FIG. 15B. The working area A is formed by an end of a seat rail. The image-capturing device 12, in this embodiment, generates at least one image 121 of the seat rail, of the bit and of the screw for identifying the working area.

Figure 16A:
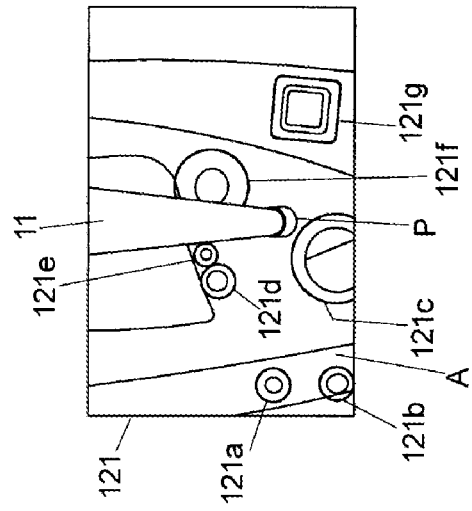
FIG. 16A shows a working area containing essential features at an angle of 0°.
Figure 16B:
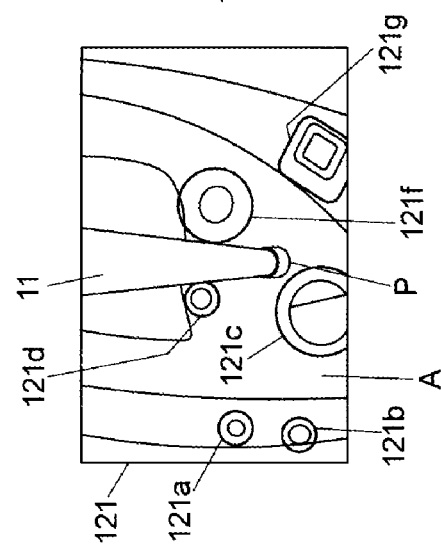
FIG. 16B shows a working area containing essential features at an angle of 3°.
Figure 16C:
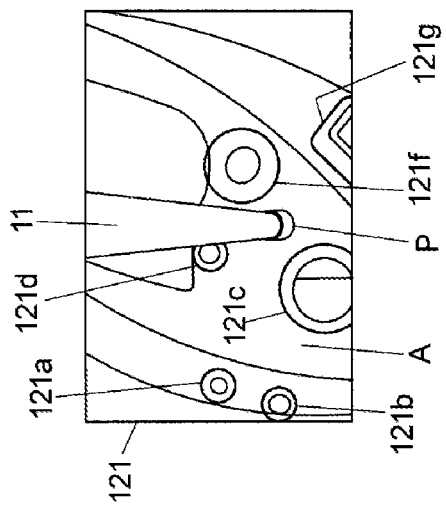
FIG. 16C shows a working area containing essential features at an angle of 8°.

FIGS. 16A-16C each show an image 121 of a working area A on a motor vehicle door. The angle of the machining tool 1 in FIG. 16A is defined as 0° in an image plane that is arranged substantially parallel to the working area A. Multiple essential features 121a, 121b, 121c, 121d, 121f, 121g may be seen on the working area A. The essential features 121a, 121b, 121c, 121d, 121f, 121g are formed by holes, screws and a cover. The machining tool 1 in FIG. 16B is rotated by 3° in the image plane in relation to the machining tool 1 in FIG. 16A. The rotation allows a larger section of the essential feature 121g, which is identified by a rectangle, to be seen. The machining tool 1 in FIG. 16C is rotated by a further 5° to 8° in the image plane in relation to FIG. 16C. The rotation has caused the essential features 121a, 121b, 121c, 121d, 121f, 121g to be displaced further within the image 121. A further essential feature 121e, which was previously concealed by the tool component 11, is visible. The images shown in FIGS. 16A-C form a successive series of images. The images of a series of images in principle do not have any relationship with one another. The evaluation unit 2 may be used to link the images 121 via the essential features 121a, 121b, 121c, 121d, 121e, 121f, 121g that they contain in order to establish a relationship between the images of a series of images (feature recognition). Linking images may make it possible to increase a probability level of identifying the machined working area.

Figure 17A:
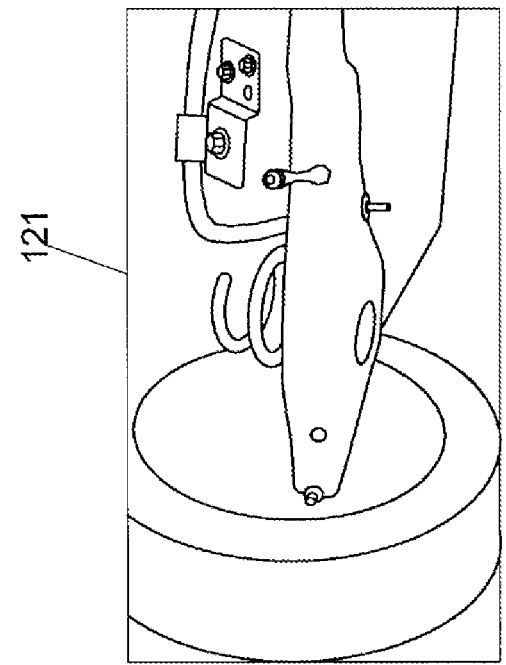
FIG. 17A shows a missing component on a motor vehicle.
Figure 17B:
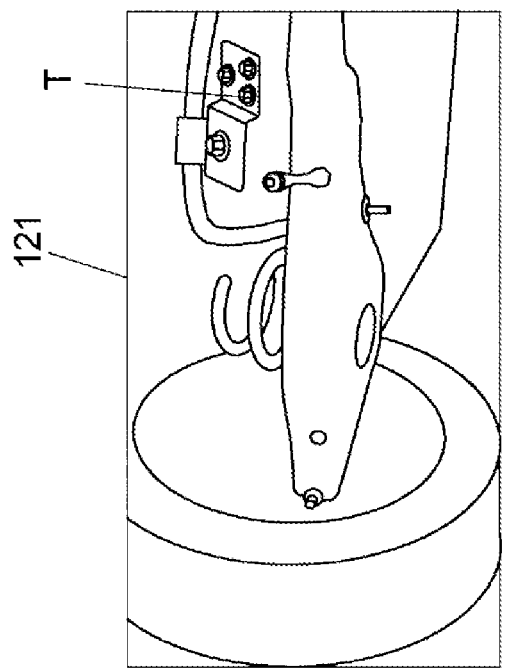
FIG. 17B shows a retrospectively installed component on a motor vehicle.

FIG. 17A shows a working area A of a motor vehicle that is missing a component T. The absence of the component is able to be detected by way of the device. To this end, the evaluation unit 2 determines the missing component T. The evaluation unit 2 thus recognizes the absence, that is to say the lack of presence of the component T, on the motor vehicle. FIG. 17B shows the working area A of the motor vehicle on which the screw T is installed.

LIST OF REFERENCE SIGNS 1 machining tool
11 tool component
12 image-capturing device
120 image (training)
120' image (simulation)
121 image
121a, 121b, 121c, essential feature
121d, 121e, 121f,
121g
121' unknown image
122, 122a, 122b lens
123 cable
124 image-capturing cone
13 sensor
130 sensor data (training)
130' sensor data (simulation)
131 sensor data
131' unknown sensor data
14 illumination device
15 adapter
2 evaluation unit
21 computing model
221, 222, 231, 232 classifier
24 classifier memory 3 supervision unit
4 control unit
5 signaling device
6 simulation system
7 test working area
8 indicator device
9 interface
A working area
B object
D detection axis
E action axis
O optical axis
P working point
S1 first step
S2 second step
S3 third step
T component

The invention claimed is:

1. A device comprising:
a machining tool for machining at least one working area of an object;
an image-capturing device configured for generating at least one image of the at least one working area;
at least one sensor configured for generating sensor data during machining of the at least one working area;
an evaluation unit comprising a computing model configured for identifying, with the at least one image and/or the sensor data, a relative position of the machining tool with respect to the working point or with respect to the at least one working area and/or a situation during machining of the at least one working area;
a simulation system configured for simulating the at least one working area for generating the at least one image, generating the sensor data and/or generating at least one classifier; and
a control unit connected to the machining tool and/or the evaluation unit, the control unit configured to control a state of a tool component of the machining tool that interacts with the at least one working area to perform an action based on the generated sensor data during machining of the at least one working area and the simulation of the at least one working area;
wherein the computing model has been trained by way of machine learning on the basis of images of working areas and sensor data;
wherein the image-capturing device and the at least one sensor are arranged on the machining tool;
wherein the image capturing device and the tool component of the machining tool that interacts with the working area are positioned on the machining tool for movement together on the machining tool; and
wherein the image-capturing device comprises at least one lens, the at least one lens is arranged such that at least one optical axis of the at least one lens intersects a working point at which the machining tool acts on the at least one working area and/or the at least one optical axis of at least one lens extends parallel to an action axis along which the machining tool acts on the at least one working area; and/or
wherein the at least one sensor is arranged such that at least one detection axis of the at least one sensor intersects a working point at which the machining tool acts on the at least one working area, and/or the at least one detection axis of the at least one sensor extends parallel to an action axis along which the machining tool acts on the at least one working area.

2. The device as claimed in claim 1, wherein the computing model is configured to generate the at least one classifier from at least one image and/or the sensor data, which classifier represents at least one essential feature of the at least one image and/or of the sensor data.

3. The device as claimed in claim 1, wherein at least one of
the evaluation unit is configured to select a key area of the at least one image for training the computing model and/or for identifying the at least one working area based on a user input, and
the computing model is configured to identify an installation step in an installation process on the basis of a sequence of images and/or sensor data.

4. The device as claimed in claim 1, wherein the evaluation unit is configured, in a sequence of a multiplicity of known images and/or known sensor data containing at least one unknown image and/or at least one section of unknown sensor data, to recognize the at least one unknown image and/or the at least one unknown section of sensor data.

5. The device as claimed in claim 1, wherein the evaluation unit is configured to identify an area of the object that should not be machined and/or to distinguish it from the at least one working area.

6. The device as claimed in claim 1, further comprising a supervision unit that is configured to document a sequence of working areas that have been machined by the machining tool.

7. The device as claimed in claim 6, wherein at least one of
the supervision unit is configured to specify a sequence of working areas to be machined by the machining tool,
the supervision unit is configured to group together at least two working areas in a sequence of working areas to be machined by the machining tool, and
the supervision unit is connected to the machining tool, the image-capturing device, the at least one sensor and/or the evaluation unit in order to exchange data.

8. The device as claimed in claim 1, further comprising at least one of
a signaling device configured for outputting a signal to a user of the machining tool, by way of which it is possible to signal to the user that at least one working area has not been recognized, at least one working area has been machined incorrectly and/or at least one working area in a sequence of working areas has not been machined, and
a test working area for calibrating the device, in particular the image-capturing device and/or the at least one sensor.

9. The device as claimed in claim 1, wherein the image-capturing device comprises at least one illumination device that illuminates the at least one working area or at least part thereof and/or the machining tool or at least part thereof and/or projects at least one pattern onto the at least one working area.

10. The device as claimed in claim 1, wherein at least one of:
the image-capturing device comprises at least one camera, in particular having a zoom lens,
the image-capturing device comprises at least one camera that is able to be adjusted in relation to the machining tool,
the image-capturing device comprises at least two cameras for simultaneously generating at least two images of the at least one working area, the image-capturing device is configured to generate a multiplicity of images before, during and/or after the action of the machining tool on the at least one working area,
a number of generated images per unit of time is able to be varied by the image-capturing device,
the image-capturing device is configured to start and/or to end the generation of images automatically based on sensor data, and
the image-capturing device comprises a mobile terminal, wherein the at least one sensor or some of the sensors are optionally integrated into the mobile terminal.

11. The device as claimed in claim 1, wherein at least one of
a connecting straight line between two lenses of the image-capturing device and/or between two sensors intersects an action axis along which the machining tool acts on the at least one working area, and
a multiplicity of lenses of the image-capturing device and/or a multiplicity of sensors is arranged annularly around an action axis along which the machining tool (1) acts on the at least one working area.

12. The device as claimed in claim 1, wherein the evaluation unit is configured to identify at least one tool component of the machining tool on the basis of the at least one image.

13. The device as claimed in claim 12, further comprising an indicator device that is configured to indicate a necessary exchange of the at least one tool component of the machining tool to a user of the machining tool and/or to monitor the exchange of the at least one tool component by way of evaluating at least one image and/or sensor data.

14. The device as claimed in claim 1, wherein the evaluation unit is configured to identify at least one component of the object that is arranged in the at least one working area.

15. The device as claimed in claim 1, wherein at least one of
the image-capturing device is arranged on the machining tool by way of an adapter,
the image-capturing device is connected to the evaluation unit in order to exchange data, and
further comprising at least one interface that is provided for connection to another system.

16. The device as claimed in claim 1, wherein the state of the tool component controlled by the control unit is a rotational speed or torque of the tool component.

17. The device as claimed in claim 1, wherein the action performed by the tool component is install an element on an object.

18. The device as claimed in claim 17, wherein the element is a screw, rivet, or clamp.

19. The device as claimed in claim 1, wherein the machining tool is a torque wrench, an industrial screwdriver, a hand-held assembly device, a pistol-grip screwdriver, a rivet gun, a clamping device, a drill, an axial screwdriver, or an offset screwdriver.

20. A method for machining at least one working area of an object using a machining tool, the method comprising:
generating at least one image of the at least one working area using an image-capturing device;
generating sensor data during machining of the at least one working area using at least one sensor;
identifying, with the at least one image and/or the sensor data, a relative position of the machining tool with respect to the working point or with respect to the at least one working area and/or a situation during machining of the at least one working area using an evaluation unit comprising a computing model;
simulating the at least one working area for generating the at least one image, the sensor data and/or at least one classifier using a simulation system; and
controlling, by a control unit connected to the machining tool and/or the evaluation unit, a state of a tool component of the machining tool that interacts with the at least one working area to perform an action based on the generated sensor data during machining of the at least one working area and the simulation of the at least one working area;
wherein the computing model has been trained by way of machine learning on the basis of images of working areas and sensor data;
wherein the image-capturing device and the at least one sensor are arranged on the machining tool;
wherein the image capturing device and the tool component of the machining tool that interacts with the working area are positioned on the machining tool for movement together on the machining tool; and
wherein the image-capturing device comprises at least one lens, the at least one lens is arranged such that at least one optical axis of the at least one lens intersects a working point at which the machining tool acts on the at least one working area and/or the at least one optical axis of at least one lens extends parallel to an action axis along which the machining tool acts on the at least one working area; and/or
wherein the at least one sensor is arranged such that at least one detection axis of the at least one sensor intersects a working point at which the machining tool acts on the at least one working area, and/or the at least one detection axis of the at least one sensor extends parallel to an action axis along which the machining tool acts on the at least one working area.

21. The method as claimed in claim 20, wherein at least one of
the at least one classifier is generated from at least one image and/or the sensor data using the computing model, wherein said classifier represents at least one essential feature of the at least one image and/or of the sensor data,
an installation step in an installation process is identified on the basis of a sequence of images and/or sensor data using the computing model, and
at least one unknown image and/or at least one section of unknown sensor data is recognized in a sequence of a multiplicity of known images and/or known sensor data using the evaluation unit.

22. The method as claimed in claim 20, wherein the state of the tool component controlled by the control unit is a rotational speed or torque of the tool component.

23. The method as claimed in claim 20, wherein the action performed by the tool component is install an element on an object.

24. The method as claimed in claim 23, wherein the element is a screw, rivet, or clamp.

25. The method as claimed in claim 20, wherein the machining tool is a torque wrench, an industrial screwdriver, a hand-held assembly device, a pistol-grip screwdriver, a rivet gun, a clamping device, a drill, an axial screwdriver, or an offset screwdriver.

* * * * *